United States Patent
Azuma

(10) Patent No.: US 11,789,325 B2
(45) Date of Patent: Oct. 17, 2023

(54) LIQUID CRYSTAL DISPLAY APPARATUS

(71) Applicant: Sharp Display Technology Corporation, Kameyama (JP)

(72) Inventor: Kikuko Azuma, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/115,664

(22) Filed: Feb. 28, 2023

(65) Prior Publication Data

US 2023/0280622 A1    Sep. 7, 2023

Related U.S. Application Data

(60) Provisional application No. 63/315,812, filed on Mar. 2, 2022.

(51) Int. Cl.
*G02F 1/1339* (2006.01)
*G02F 1/1362* (2006.01)
*G02F 1/1343* (2006.01)
*G02F 1/1335* (2006.01)

(52) U.S. Cl.
CPC ...... *G02F 1/136204* (2013.01); *G02F 1/1339* (2013.01); *G02F 1/134309* (2013.01); *G02F 1/133514* (2013.01); *G02F 1/136222* (2021.01); *G02F 2202/16* (2013.01)

(58) Field of Classification Search
CPC ............. G02F 1/1339; G02F 1/134309; G02F 1/133514; G02F 1/136222; G02F 2202/16
See application file for complete search history.

(56) References Cited

U.S. PATENT DOCUMENTS

2004/0227895 A1* 11/2004 Yoo ................ G02F 1/1339
349/152
2022/0075223 A1    3/2022 Ishikawa et al.

FOREIGN PATENT DOCUMENTS

WO    2020241527 A1    12/2020

* cited by examiner

*Primary Examiner* — James A Dudek
(74) *Attorney, Agent, or Firm* — ScienBiziP, P.C.

(57) ABSTRACT

A liquid crystal display apparatus includes an active matrix substrate, a counter substrate opposing the active matrix substrate, a liquid crystal layer provided between the active matrix substrate and the counter substrate, and a sealing portion that surrounds the liquid crystal layer. The active matrix substrate includes a first substrate and a first transparent conductive layer. The counter substrate includes a second substrate and a second transparent conductive layer. The active matrix substrate further includes a capacitance element that is disposed at an outer side of the sealing portion or disposed at least partially overlapping with the sealing portion. One of the active matrix substrate and the counter substrate further includes a projection structure. A section of the second transparent conductive layer present at an outer side of the sealing portion is in contact with the first transparent conductive layer on a top face of the projection structure.

20 Claims, 22 Drawing Sheets

LIQUID CRYSTAL DISPLAY APPARATUS

CROSS REFERENCE TO RELATED APPLICATION

The present application claims priority from Provisional Application No. 63/315,812, the content to which is hereby incorporated by reference into this application.

BACKGROUND OF THE DISCLOSURE

1. Field of the Disclosure

The disclosure relates to a liquid crystal display apparatus.

2. Description of the Related Art

Liquid crystal display apparatuses are being used in various applications such as mobile terminals and televisions. In recent years, there has been an increasing demand for frame narrowing for the purpose of widening the display region of a liquid crystal display apparatus, from the viewpoint of design, and the like. For example, in a liquid crystal display apparatus disclosed in WO 2020/241527, the width of a sealing portion surrounding a liquid crystal layer is decreased to obtain a narrower frame.

SUMMARY

For example, in a peripheral region (also referred to as a "frame region" or "non-display region" in some cases) of a liquid crystal display apparatus having a narrow frame, a transparent conductive layer included in a counter substrate is exposed at an outer side of a sealing portion in some cases. When the transparent conductive layer is exposed in the peripheral region of the counter substrate, the transparent conductive layer is easily charged during a process of manufacturing the liquid crystal display apparatus, for example, in a process of pasting the counter substrate and an active matrix substrate to each other, a process of mounting a terminal in the peripheral region of the counter substrate, or the like. When electrostatic discharge (ESD) occurs in the display region due to the charging of the transparent conductive layer, a display defect may be caused. Details will be described below. Note that the problem of a display defect being caused by ESD is not limited to a liquid crystal display apparatus having a narrow frame.

The disclosure has been contrived to solve the above-described problem, and an object of the disclosure is to provide a liquid crystal display apparatus capable of suppressing a display defect caused by ESD.

According to embodiments of the disclosure, solutions described in the following items are provided.

Item 1
 A liquid crystal display apparatus, including,
 an active matrix substrate,
 a counter substrate opposing the active matrix substrate,
 a liquid crystal layer provided between the active matrix substrate and the counter substrate, and
 a sealing portion provided between the active matrix substrate and the counter substrate and surrounding the liquid crystal layer,
 in which the active matrix substrate includes a first substrate and a first transparent conductive layer supported by the first substrate,
 the counter substrate includes a second substrate and a second transparent conductive layer supported by the second substrate,
 the active matrix substrate further includes a capacitance element disposed at an outer side of the sealing portion or disposed at least partially overlapping with the sealing portion in a view from a normal direction of the first substrate, the capacitance element including a first capacitance electrode included in the first transparent conductive layer, a second capacitance electrode disposed opposing the first capacitance electrode between the first capacitance electrode and the first substrate, and a dielectric layer located between the first capacitance electrode and the second capacitance electrode,
 one of the active matrix substrate and the counter substrate further includes a projection structure disposed at an outer side of the sealing portion, provided between the first substrate and the first transparent conductive layer or between the second substrate and the second transparent conductive layer, and projecting toward a side of the other one of the active matrix substrate and the counter substrate,
 the second transparent conductive layer includes a first section present in a region surrounded by the sealing portion, a second section overlapping with the sealing portion in a view from a normal direction of the second substrate, and a third section present at an outer side of the sealing portion, and
 the third section of the second transparent conductive layer is in contact with the first transparent conductive layer on a top face of the projection structure.

Item 2
 The liquid crystal display apparatus according to item 1, in which the capacitance element is disposed at least partially overlapping with the sealing portion in a view from the normal direction of the first substrate.

Item 3
 The liquid crystal display apparatus according to item 1, in which the capacitance element is disposed at an outer side of the sealing portion.

Item 4
 The liquid crystal display apparatus according to any one of items 1 to 3,
 in which the first transparent conductive layer further includes a first extension portion extending from the first capacitance electrode and disposed farther from the sealing portion than the first capacitance electrode, and
 the third section of the second transparent conductive layer is in contact with the first extension portion on the top face of the projection structure.

Item 5
 The liquid crystal display apparatus according to any one of items 1 to 4,
 in which the other one of the active matrix substrate and the counter substrate further includes a conductive portion provided between the first substrate and the first transparent conductive layer or between the second substrate and the second transparent conductive layer in such a manner that an upper face of the conductive portion opposes the top face of the projection structure, and
 the third section of the second transparent conductive layer is in contact with the first transparent conductive layer between the upper face of the conductive portion and the top face of the projection structure.

Item 6
 The liquid crystal display apparatus according to any one of items 1 to 5,
   in which the active matrix substrate further includes an additional capacitance element including the second capacitance electrode, a third capacitance electrode disposed opposing the second capacitance electrode between the second capacitance electrode and the first substrate, and an additional dielectric layer located between the second capacitance electrode and the third capacitance electrode.

Item 7
 The liquid crystal display apparatus according to item 6, in which the third capacitance electrode is electrically connected to the first transparent conductive layer.

Item 8
 The liquid crystal display apparatus according to item 6 citing item 5 or according to item 7 citing item 6 citing item 5,
   in which the conductive portion and the third capacitance electrode are included in an identical layer.

Item 9
 The liquid crystal display apparatus according to item 8, in which the conductive portion extends from the third capacitance electrode and is substantially T-shaped in a view from the normal direction of the first substrate.

Item 10
 The liquid crystal display apparatus according to item 3,
   in which the third section of the second transparent conductive layer is in contact with the first capacitance electrode on the top face of the projection structure.

Item 11
 The liquid crystal display apparatus according to item 10,
   in which the active matrix substrate further includes an additional capacitance element including the second capacitance electrode, a third capacitance electrode disposed opposing the second capacitance electrode between the second capacitance electrode and the first substrate, and an additional dielectric layer located between the second capacitance electrode and the third capacitance electrode.

Item 12
 The liquid crystal display apparatus according to item 11, in which the third capacitance electrode is electrically connected to the first capacitance electrode.

Item 13
 The liquid crystal display apparatus according to item 12,
   in which the active matrix substrate further includes a contact portion included in a conductive layer identical to the conductive layer of the third capacitance electrode and electrically connected to the third capacitance electrode,
   the dielectric layer and the additional dielectric layer include a contact hole reaching the contact portion,
   the first transparent conductive layer further includes a second extension portion extending from the first capacitance electrode and disposed closer to the sealing portion than the first capacitance electrode, and the second extension portion is connected to the contact portion inside the contact hole.

Item 14
 The liquid crystal display apparatus according to item 13, in which the contact hole is covered with the sealing portion in a view from the normal direction of the first substrate.

Item 15
 The liquid crystal display apparatus according to item 13 or 14,
   in which the contact portion extends substantially parallel to the third capacitance electrode in a view from the normal direction of the first substrate, and
   the layer including the third capacitance electrode further includes a connection portion configured to connect the contact portion and the third capacitance electrode.

Item 16
 The liquid crystal display apparatus according to any one of items 1 to 15,
   in which the counter substrate includes the projection structure,
   the counter substrate includes a color filter layer including a color filter, and
   the projection structure is formed of a material identical to a material of the color filter.

Item 17
 The liquid crystal display apparatus according to item 16,
   in which the counter substrate further includes a columnar spacer provided in a region surrounded by the sealing portion and configured to define a distance between the active matrix substrate and the counter substrate, and
   the columnar spacer is formed of a material identical to the material of the color filter and is provided between the second substrate and the second transparent conductive layer.

Item 18
 The liquid crystal display apparatus according to any one of items 1 to 15,
   in which the active matrix substrate includes the projection structure,
   the active matrix substrate includes a color filter layer including a color filter, and
   the projection structure is formed of a material identical to a material of the color filter.

Item 19
 The liquid crystal display apparatus according to any one of items 16 to 18,
   in which the color filter layer includes a plurality of the color filters, and the projection structure includes a plurality of portions each formed of a material identical to a material of a corresponding color filter of the plurality of color filters having mutually different colors among the plurality of color filters.

Item 20
 The liquid crystal display apparatus according to any one of items 1 to 19, in which the sealing portion includes conductive particles.

According to embodiments of the disclosure, a liquid crystal display apparatus capable of suppressing a display defect caused by ESD is provided.

DETAILED DESCRIPTION OF THE DISCLOSURE

Hereinafter, embodiments of the disclosure will be described with reference to the accompanying drawings. Note that the disclosure is not limited to the embodiments to be described below. In the following drawings, constituent elements having substantially the same functions may be denoted by common reference signs, and description thereof may be omitted.

First Embodiment

Figure 1A:
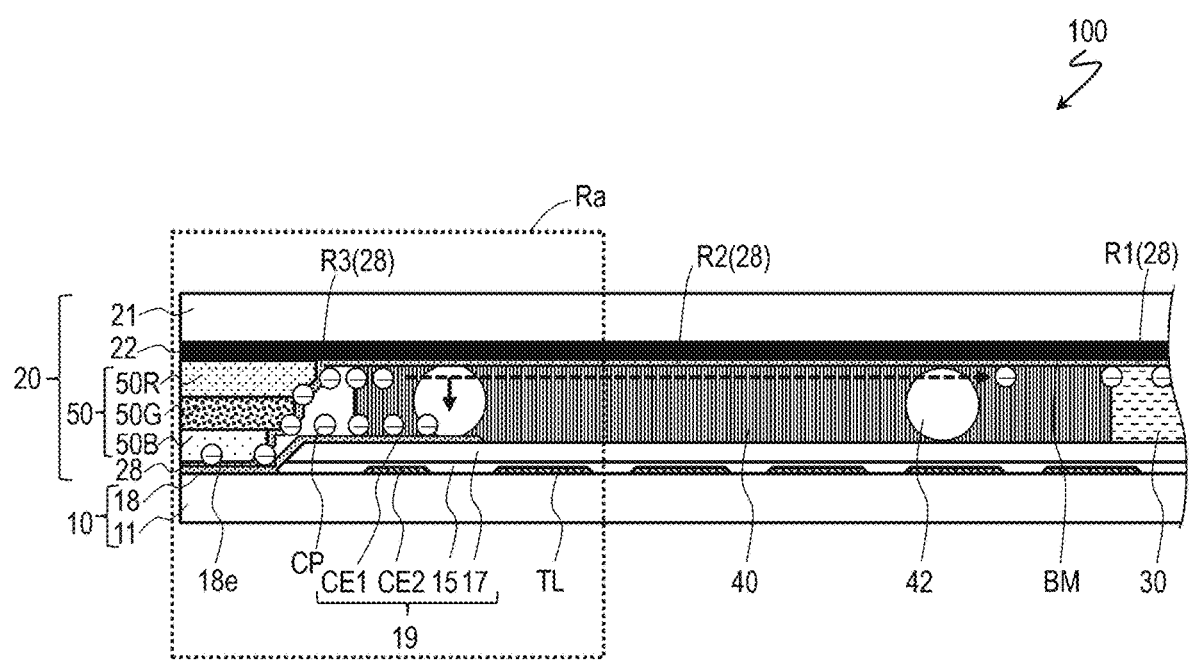
FIG. 1A is a schematic cross-sectional view of a liquid crystal display apparatus 100 according to a first embodiment of the disclosure.
Figure 1B:
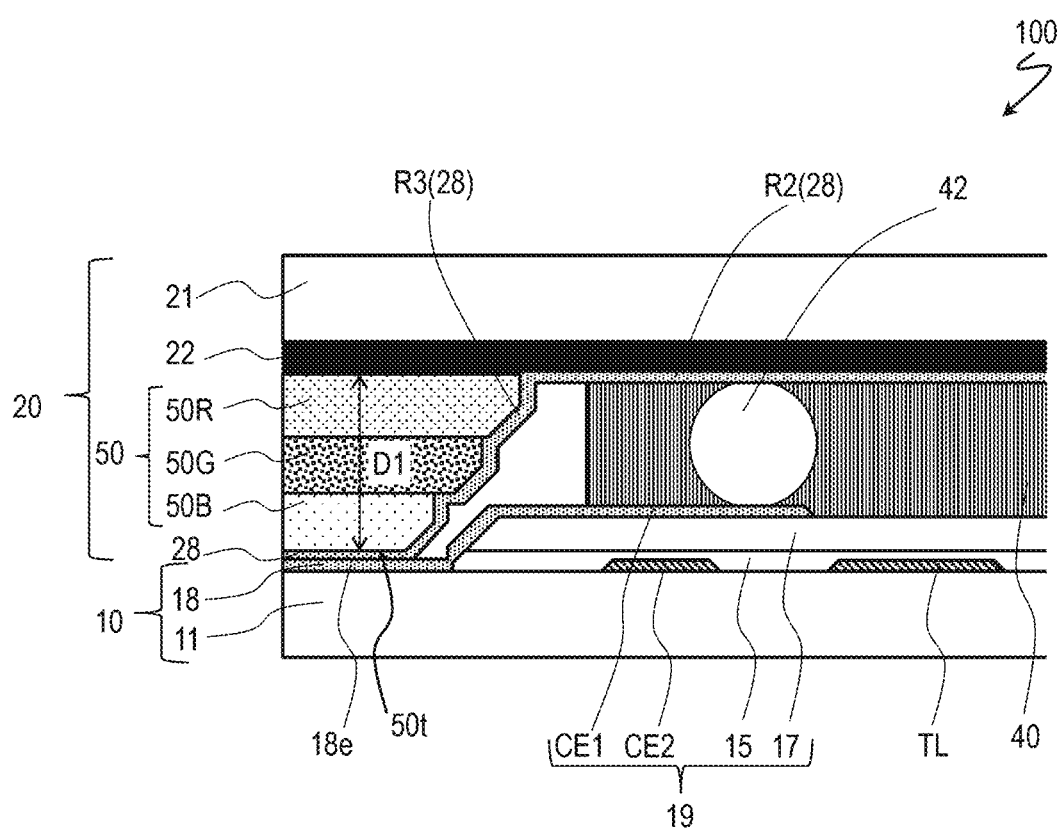
FIG. 1B is an enlarged view of a portion (a region Ra surrounded by a dotted line) in FIG. 1A.
Figure 1C:
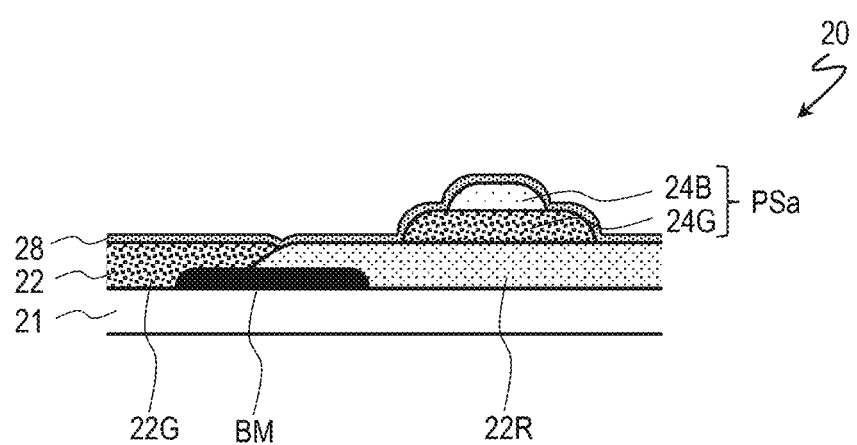
FIG. 1C is a schematic cross-sectional view illustrating an example of a columnar spacer included in the liquid crystal display apparatus 100.
Figure 1D:
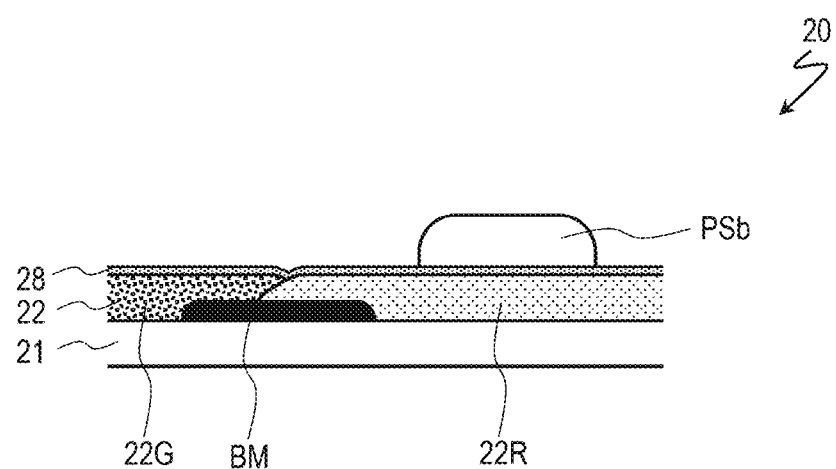
FIG. 1D is a schematic cross-sectional view illustrating an example of a columnar spacer included in the liquid crystal display apparatus 100.
Figure 1E:
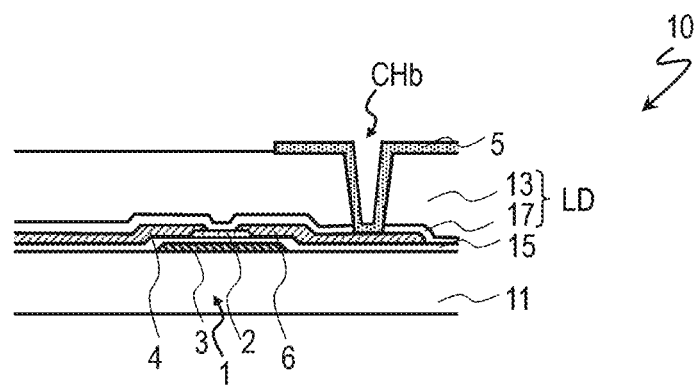
FIG. 1E is a cross-sectional view illustrating an example of a TFT 1 included in an active matrix substrate 10 included in the liquid crystal display apparatus 100.
Figure 2:
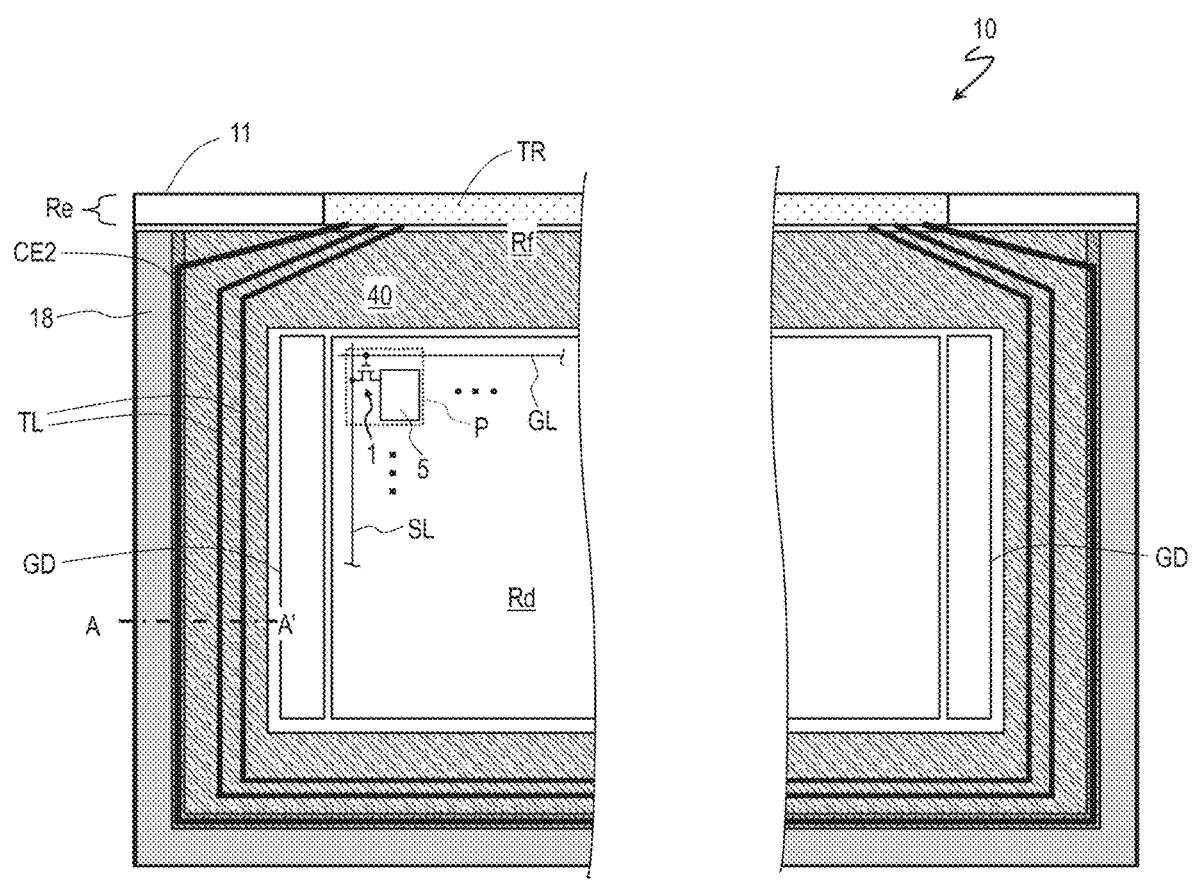
FIG. 2 is a schematic plan view of the active matrix substrate 10 included in the liquid crystal display apparatus 100.
Figure 3:
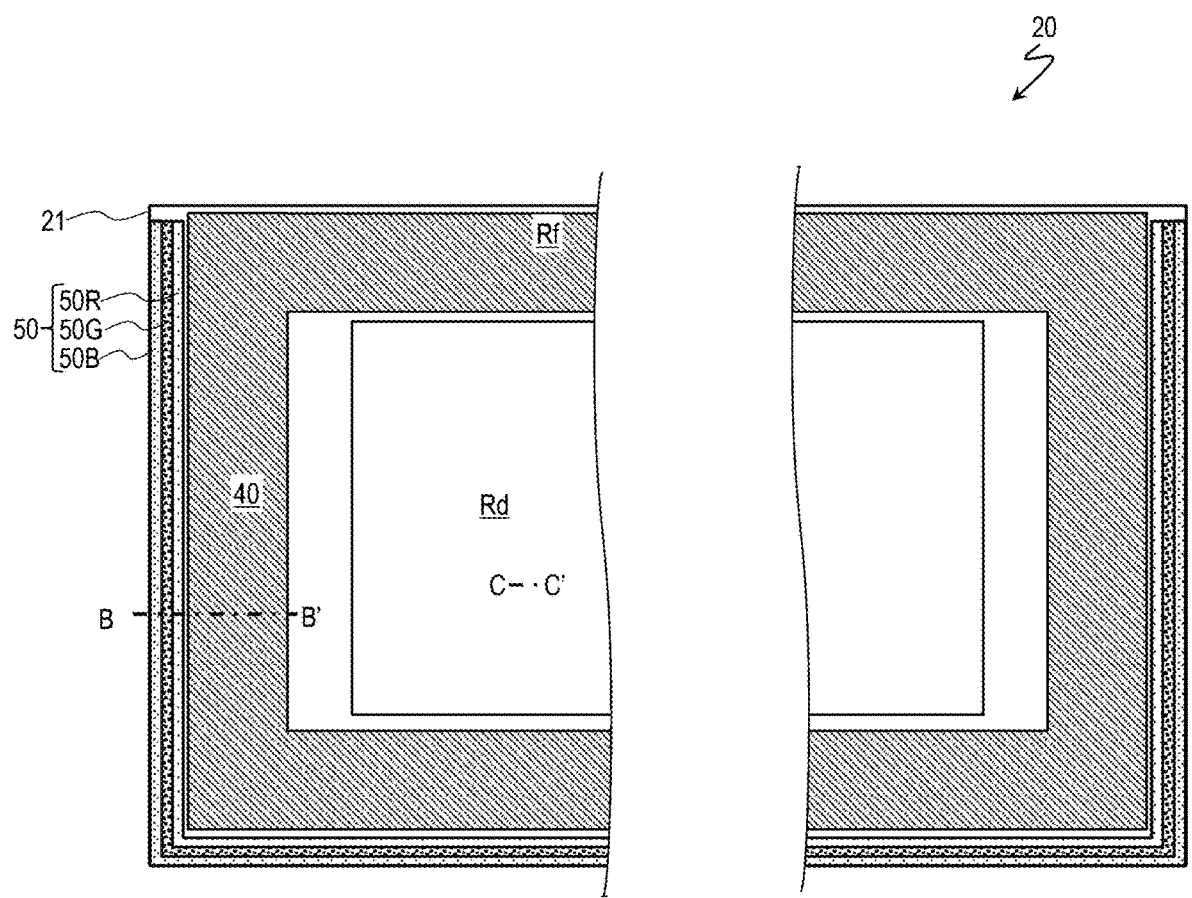
FIG. 3 is a schematic plan view of a counter substrate 20 included in the liquid crystal display apparatus 100.

A liquid crystal display apparatus 100 according to the present embodiment will be described with reference to FIG. 1A, FIG. 1B, FIG. 1C, FIG. 1D, FIG. 1E, FIG. 2, and FIG. 3. FIG. 1A is a cross-sectional view schematically illustrating the liquid crystal display apparatus 100, and FIG. 1B is an enlarged view of a portion (a region Ra surrounded by a dotted line) in FIG. 1A. FIG. 1C and FIG. 1D are cross-sectional views each schematically illustrating an example of a columnar spacer included in the liquid crystal display apparatus 100. FIG. 1E is a cross-sectional view illustrating an example of a TFT 1 included in the liquid crystal display apparatus 100. FIG. 2 and FIG. 3 are plan views schematically illustrating an active matrix substrate 10 and a counter substrate 20, respectively, included in the liquid crystal display apparatus 100. FIG. 1A illustrates a cross section taken along a line A-A' in FIG. 2, and a cross section taken along a line B-B' in FIG. 3. FIG. 1C and FIG. 1D illustrate cross sections each taken along a line C-C' in FIG. 3.

As illustrated in FIG. 1A, the liquid crystal display apparatus 100 includes an active matrix substrate 10, a counter substrate 20, a liquid crystal layer 30, and a sealing portion 40.

As illustrated in FIG. 2 and FIG. 3, the liquid crystal display apparatus 100 includes a display region Rd, where display is performed, and a peripheral region Rf other than the display region Rd. The peripheral region Rf is provided on the upper side, the lower side, the left side, and the right side of the display region Rd. The peripheral region Rf is provided so as to surround the display region Rd. In the active matrix substrate 10, a terminal portion TR is provided in the peripheral region Rf on the upper side of the display region Rd. The terminal portion TR of the active matrix substrate 10 does not face the counter substrate 20. A portion Re of the active matrix substrate 10 including the terminal portion TR does not overlap with the counter substrate 20 when viewed from the normal direction of the active matrix substrate 10 (first substrate 11). FIG. 2 schematically illustrates the sealing portion 40 along with the active matrix substrate 10, and FIG. 3 schematically illustrates the sealing portion 40 along with the counter substrate 20.

As illustrated in FIG. 2, the display region Rd is defined by a plurality of pixels P arranged in a matrix shape having a plurality of rows and a plurality of columns. Each pixel P is provided with a thin film transistor (TFT) 1 and a pixel electrode 5. The TFT 1 is supplied with a gate signal from a corresponding gate wiring line GL, from among a plurality of gate wiring lines GL extending in the row direction, and is supplied with a source signal from a corresponding source wiring line SL, from among a plurality of source wiring lines SL extending in the column direction. The pixel electrode 5 is formed of a transparent conductive material (an indium tin oxide or an indium zinc oxide, for example) and is electrically connected to the corresponding TFT 1.

The active matrix substrate 10 includes the above-described TFT 1, pixel electrode 5, gate wiring line GL and source wiring line SL, and the first substrate 11 (for example, a glass substrate) supporting these constituent elements. The active matrix substrate 10 further includes a first transparent conductive layer 18 supported by the first substrate 11. The first transparent conductive layer 18 is provided in the peripheral region Rf of the active matrix substrate 10. In the peripheral region Rf of the active matrix substrate 10, the first transparent conductive layer 18 is formed as a layer farthest from the first substrate 11. The first transparent conductive layer 18 is formed of a transparent conductive material, and is, for example, an ITO layer. The first transparent conductive layer 18 is included in, for example, a conductive layer including the pixel electrode 5 of the TFT 1. That is, the first transparent conductive layer 18 and the pixel electrode 5 are formed in the same process, by patterning a conductive film (transparent conductive film) to form the pixel electrode 5, for example. However, the first transparent conductive layer 18 may be included in a layer different from that of the pixel electrode 5.

In FIG. 2, the first transparent conductive layer 18 is indicated by a gray region. In the liquid crystal display apparatus 100, as illustrated in FIG. 2, the first transparent conductive layer 18 is provided in a region along an end portion of the first substrate 11 when viewed from the normal direction of the first substrate 11. In this case, the first transparent conductive layer 18 is provided in a region along three sides selected from the four sides of the rectangular first substrate 11 by excluding a side at which the terminal portion TR is provided (the side on the upper side).

As illustrated in FIG. 1A, the active matrix substrate 10 further includes a capacitance element 19. The capacitance element 19 includes a first capacitance electrode CE1, a second capacitance electrode CE2 disposed opposing the first capacitance electrode CE1, and dielectric layers 15 and 17 located between the first capacitance electrode CE1 and the second capacitance electrode CE2. The capacitance element 19 is disposed at least partially overlapping with (in the example illustrated in the drawing, disposed entirely overlapping with) the sealing portion 40 when viewed from the normal direction of the first substrate 11. That is, the first capacitance electrode CE1 at least partially overlaps with (entirely overlaps with in the illustrated example) the sealing portion 40 when viewed from the normal direction of the first substrate 11, and the second capacitance electrode CE2 at least partially overlaps with (entirely overlaps with in the illustrated example) the sealing portion 40 when viewed from the normal direction of the first substrate 11. The first capacitance electrode CE1 is included in the first transparent conductive layer 18. The second capacitance electrode CE2 is disposed between the first capacitance electrode CE1 and the first substrate 11. In this example, the second capacitance electrode CE2 is included in a conductive layer including a gate electrode 3 (also referred to as a "gate metal layer" in some cases) of the TFT 1 having a bottom gate structure. That is, for example, by patterning a conductive film (gate metal film) to form the gate electrode 3, the second capacitance electrode CE2 and the gate electrode 3 are formed in the same process. The dielectric layers included in the capacitance element 19 may have a layered structure of a plurality of layers (two layers in the illustrated example) or may be a single layer. For example, the dielectric layer 15 is formed in the same layer as that of a gate insulating layer 15 provided between the gate electrode 3 and a semiconductor layer 2 included in the TFT 1 (see FIG. 1E). The gate insulating layer 15 is formed substantially over the entire surface of the first substrate 11, and part of the gate insulating layer 15 functions as the dielectric layer 15 constituting the capacitance element 19. The dielectric layer 17 is formed, for example, in the same layer as that of an interlayer inorganic insulating layer 17 covering the TFT 1. The interlayer inorganic insulating layer 17 is disposed above the layer (gate metal layer) including the gate electrode 3 and a layer (source metal layer) including a source electrode 4 of the TFT 1. The interlayer inorganic insulating layer 17 is formed substantially over the entire surface of the first substrate 11, and part of the interlayer inorganic insulating layer 17 functions as the dielectric layer 17 constituting the capacitance element 19.

FIG. 1E illustrates an example of the TFT 1 (a cross-sectional structure of the vicinity of the TFT 1). The TFT 1 illustrated in FIG. 1E has a bottom gate structure, and includes the semiconductor layer 2, the gate electrode 3, the source electrode 4, and a drain electrode 6. The gate electrode 3 is formed on the first substrate 11 and is covered with the gate insulating layer 15. The semiconductor layer 2 is formed on the gate insulating layer 15 in such a manner as to oppose the gate electrode 3. In other words, the gate electrode 3 faces the semiconductor layer 2 with the gate insulating layer 15 interposed therebetween. The source electrode 4 and the drain electrode 6 are formed on the semiconductor layer 2 and on the gate insulating layer 15, and are electrically connected to the semiconductor layer 2. The TFT 1 is covered with an interlayer insulating layer LD. In this case, the interlayer insulating layer LD has a configuration in which the interlayer inorganic insulating layer (passivation layer) 17 and an organic insulating layer (flattened layer) 13 are layered in that order. The pixel electrode 5 is provided on the interlayer insulating layer LD, and is connected to the drain electrode 6 of the TFT 1 in a contact hole CHb formed in the interlayer insulating layer LD.

The counter substrate 20 is disposed opposing the active matrix substrate 10. The counter substrate 20 includes a second substrate 21 (for example, a glass substrate) and a second transparent conductive layer 28 (not illustrated in FIG. 3) supported by the second substrate 21. The second transparent conductive layer 28 includes a first section R1 present in a region surrounded by the sealing portion 40, a second section R2 overlapping with the sealing portion 40 when viewed from the normal direction of the second substrate 21, and a third section R3 present at an outer side of the sealing portion 40. For example, in a case where the liquid crystal display apparatus 100 is a liquid crystal display apparatus of a vertical electrical field mode, the first section R1 includes a counter electrode (also referred to as a common electrode in some cases) provided so as to face the pixel electrode 5 included in each of the plurality of pixels P. The second transparent conductive layer 28 is provided, for example, substantially over the entire surface of the second substrate 21. The second transparent conductive layer 28 is provided, for example, on the outermost surface on the liquid crystal layer 30 side of the counter substrate 20 excluding an alignment film. Note that the counter substrate 20 may have a columnar spacer on the second transparent conductive layer 28 (see FIG. 1D described below). The second transparent conductive layer 28 is formed of a transparent conductive material, and is, for example, an ITO layer.

The counter substrate 20 further includes a color filter layer 22 supported by the second substrate 21. The color filter layer 22 includes a black matrix (light blocking layer) BM in the peripheral region Rf. The color filter layer 22 includes a plurality of color filters in the display region Rd (see FIG. 1C and FIG. 1D). The plurality of color filters include, for example, a red color filter 22R, a green color filter 22G, and a blue color filter (not illustrated), and these color filters are provided in a red pixel, a green pixel, and a blue pixel, respectively, among the plurality of pixels P. The plurality of pixels P may be configured in such a manner that, for example, a red pixel column, a green pixel column, and a blue pixel column are arranged in a stripe shape.

The liquid crystal layer 30 is provided between the active matrix substrate 10 and the counter substrate 20. Although not illustrated, in the display region Rd, an alignment film is formed on each of the outermost surface on the liquid crystal layer 30 side of the active matrix substrate 10 and the outermost surface on the liquid crystal layer 30 side of the counter substrate 20.

The sealing portion 40 is provided between the active matrix substrate 10 and the counter substrate 20 and is arranged so as to surround the liquid crystal layer 30. The sealing portion 40 is located in the peripheral region Rf, and the display region Rd is provided in a region surrounded by the sealing portion 40. In general, as in the illustrated example, the display region Rd is smaller in size than the region surrounded by the sealing portion 40. In the illustrated example, the active matrix substrate 10 includes a gate drive circuit GD monolithically (integrally) formed on the first substrate 11 (not illustrated in FIG. 1A). The gate drive circuit GD is disposed in the peripheral region Rf and drives the gate wiring line GL. The specific circuit configuration of the gate drive circuit GD is not particularly limited, and various known circuit configurations may be used. The gate drive circuit GD is allowed not to be monolithically formed on the active matrix substrate 10, and may be mounted on the active matrix substrate 10 by using a chip on film (COF) or chip on glass (COG) technique. In the illustrated example, gate drive circuits GD are provided on the right side and the left side of the display region Rd in the peripheral region Rf, but the gate drive circuit GD may be provided only on either the right side or the left side of the display region Rd.

The sealing portion 40 may include conductive particles 42. The sealing portion 40 may further include granular spacers. The sealing portion may include the granular spacers in place of the conductive particles 42.

The counter substrate 20 further includes a projection structure 50. The projection structure 50 is disposed at an outer side of the sealing portion 40, is provided between the second substrate 21 and the second transparent conductive layer 28, and projects toward the active matrix substrate 10 side.

The third section R3 of the second transparent conductive layer 28 is in contact with the first transparent conductive layer 18 on a top face 50t of the projection structure 50. That is, the third section R3 of the second transparent conductive layer 28 is provided in contact with the top face 50t of the projection structure 50, and a portion of the third section R3 of the second transparent conductive layer 28 provided on the top face 50t of the projection structure 50 is in contact with the first transparent conductive layer 18. In this example, the first transparent conductive layer 18 further includes a first extension portion 18e extending from the first capacitance electrode CE1 and disposed farther from the sealing portion 40 than the first capacitance electrode CE1, and the third section R3 of the second transparent conductive layer 28 is in contact with the first extension portion 18e on the top face 50t of the projection structure 50. The first capacitance electrode CE1 and the first extension portion 18e are continuously (integrally) formed. As in the illustrated example, the third section R3 of the second transparent conductive layer 28 may also be in contact with a side surface of the projection structure 50.

Since the second transparent conductive layer 28 is connected to the first transparent conductive layer 18 including the first capacitance electrode CE1 on the top face 50t of the projection structure 50, an electric charge accumulated in the second transparent conductive layer 28 is charged in the capacitance element 19. Accordingly, since a situation in which an electric charge (static electricity) having entered from the outside propagates through the second transparent conductive layer 28 to enter the display region Rd is suppressed, a situation in which the electric charge (static electricity) is discharged to the active matrix substrate 10 in the display region Rd is suppressed. Thus, the liquid crystal display apparatus 100 may suppress a display defect caused by ESD.

Figure 4:
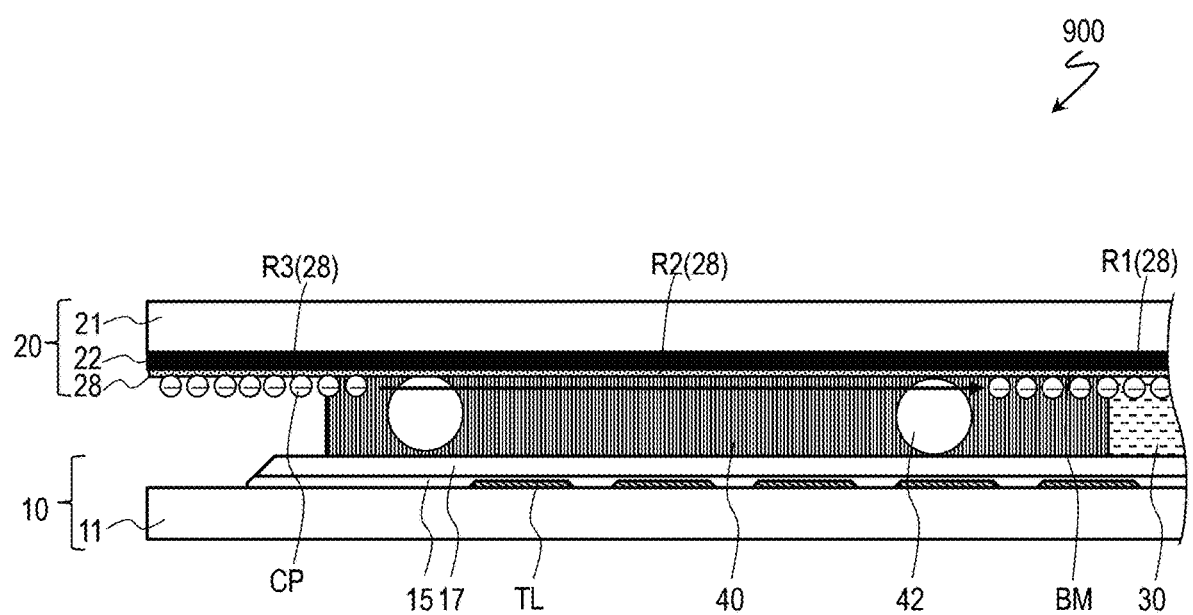
FIG. 4 is a schematic cross-sectional view of a liquid crystal display apparatus 900 of a comparative example.

A schematic cross-sectional view of a liquid crystal display apparatus 900 according to a comparative example is illustrated in FIG. 4 in order to describe in more detail the reason why the liquid crystal display apparatus 100 may suppress the display defect caused by ESD. The liquid crystal display apparatus 900 according to the comparative example is different from the liquid crystal display apparatus 100 in that the first transparent conductive layer 18 and the projection structure 50 are not provided. In the liquid crystal display apparatus 900 according to the comparative example, since a second transparent conductive layer 28 and an active matrix substrate 10 are not conductively connected to each other in the peripheral region Rf, an electric charge accumulated in the second transparent conductive layer 28 exposed in the peripheral region Rf may move to the display region Rd through the second transparent conductive layer 28 without moving to the active matrix substrate 10, and may cause ESD in the display region Rd. FIG. 4 and FIG. 1A schematically illustrate the movement of charged particles CP.

In contrast, in the liquid crystal display apparatus 100, since the second transparent conductive layer 28 is conductively connected to the first transparent conductive layer 18 included in the active matrix substrate 10 on the top face 50t of the projection structure 50 in the peripheral region Rf, the electric charge accumulated in the second transparent conductive layer 28 is charged in the capacitance element 19 via the first capacitance electrode CE1 included in the first transparent conductive layer 18. The movement of the electric charge accumulated in the second transparent conductive layer 28 to the display region Rd through the second transparent conductive layer 28 is suppressed, and thus the occurrence of ESD in the display region Rd is suppressed.

In a case where the sealing portion 40 includes the conductive particles 42, the second transparent conductive layer 28 and the first transparent conductive layer 18 are conductively connected to each other also via the conductive particles 42, and thus the occurrence of ESD in the display region Rd is more effectively suppressed.

Since the first capacitance electrode CE1 is electrically connected to the second transparent conductive layer 28, when the second transparent conductive layer 28 includes the counter electrode as described above, for example, the potential of the first capacitance electrode CE1 is equal to the common (COM) potential supplied to the counter electrode. In this example, the second capacitance electrode CE2 is connected to a terminal provided in the terminal portion TR. The second capacitance electrode CE2 is supplied with, for example, a signal that gives the common (COM) potential supplied to the counter electrode from, for example, the terminal provided in the terminal portion TR. Even when a potential equal to the potential of the first capacitance electrode CE1 is supplied to the second capacitance electrode CE2, the potential of the second capacitance electrode CE2 may vary from the supplied potential due to external static electricity, local electric charge accumulation, or the like, and consequently, the potential of the second capacitance electrode CE2 may be different from the potential of the first capacitance electrode CE1. The potential equal to the potential of the first capacitance electrode CE1 may be supplied to the second capacitance electrode CE2 as described above, but it is more preferable that a potential different from the potential of the first capacitance electrode CE1 be supplied to the second capacitance electrode CE2.

The active matrix substrate 10 further includes a plurality of trunk wiring lines TL provided in the peripheral region Rf. Each of the plurality of trunk wiring lines TL supplies a signal to, for example, one or the plurality of corresponding gate wiring lines GL or one or the plurality of corresponding source wiring lines SL among the gate wiring lines GL and the source wiring lines SL provided in the display region Rd. To each of the plurality of trunk wiring lines TL, a corresponding signal may be supplied from the terminal provided in the terminal portion TR.

The second capacitance electrode CE2 may be included in the same layer (in this case, the gate metal layer) as the plurality of trunk wiring lines TL. The second capacitance electrode CE2 is preferably disposed farther from the display region Rd than the plurality of trunk wiring lines TL. It is more preferable that the second capacitance electrode CE2 be disposed at the outermost side (closest to the end portion of the first substrate 11) among the electrodes and wiring lines included in the gate metal layer, for example.

The projection structure 50 is formed of the same materials (color resists) as those of the plurality of color filters included in the color filter layer 22. In this example, the projection structure 50 includes a red portion 50R formed of the same material as the red color filter, a portion 50G formed on the red portion 50R and formed of the same material as the green color filter, and a blue portion 50B formed on the green portion 50G and formed of the same material as the blue color filter. In this example, the upper face of the blue portion 50B constitutes the top face 50t of the projection structure 50. The projection structure is not limited to this example, and may be formed of the same materials as those of the color filters of two different colors (for example, see FIG. 11), or may be formed of only the same material as that of the color filter of one color. As in the illustrated example, when the projection structure 50 includes a plurality of the portions 50R, 50B, and 50G formed using the same materials as those of the plurality of color filters of different colors from each other, the positional relationship (layering order) or the like of the plurality of portions is not particularly limited. The height of the top face 50t of the projection structure 50 may be adjusted by adjusting a thickness of the projection structure 50, in other words, a thickness D1 (see FIG. 1B) of the projection structure 50 in the normal direction of the second substrate 21 such that the first transparent conductive layer 18 and the second transparent conductive layer 28 are in contact with each other on the top face 50t of the projection structure 50.

As illustrated in FIG. 3, the projection structure 50 is provided in the peripheral region Rf so as to extend along an edge side of the second substrate 21 when viewed from the normal direction of the second substrate 21. In the illustrated example, the projection structure 50 is provided in a region along three sides selected from the four sides of the rectangular second substrate 21 by excluding a side at which the terminal portion TR is provided (the side on the upper side).

The projection structure 50 may seal a space between the active matrix substrate 10 and the counter substrate 20. Accordingly, by providing the projection structure 50, it is possible to omit end face processing for the purpose of suppressing the entry of moisture, static electricity, or the like from the outside, and thus the manufacturing cost of the liquid crystal display apparatus 100 may be reduced.

FIG. 1C and FIG. 1D illustrate examples of columnar spacers that the liquid crystal display apparatus 100 includes in the display region Rd. For example, as illustrated FIG. 1C, the counter substrate 20 includes a columnar spacer PSa provided in a region surrounded by the sealing portion 40 and configured to define a distance between the active matrix substrate 10 and the counter substrate 20. That is, the columnar spacer PSa controls the thickness of the liquid crystal layer 30 (referred to as "cell gap" in some cases). In this example, the columnar spacer PSa is formed of the same materials as those of the plurality of color filters included in the color filter layer 22. The columnar spacer PSa is provided in a red pixel having the red color filter 22R. The columnar spacer PSa includes a green portion 24G formed of the same material as the green color filter 22G, and a blue portion 24B formed on the green portion 24G and formed of the same material as the blue color filter. The columnar spacer PSa is provided between the second substrate 21 and the second transparent conductive layer 28. That is, the second transparent conductive layer 28 is formed so as to cover the columnar spacer PSa. Since the columnar spacer PSa is formed of the same materials and formed in the same process as the color filter layer 22, the manufacturing cost may be reduced.

The counter substrate 20 including the columnar spacer PSa is manufactured as follows. First, the second substrate 21 is prepared. Then, the color filter layer 22, the columnar spacer PSa, and the projection structure 50 are formed on the second substrate 21. To be specific, first, the black matrix BM is formed on the second substrate 21, and then the red color filter 22R, the green color filter 22G, and the blue color filter are sequentially formed to form the color filter layer 22. In the process of forming the red color filter 22R, the red portion 50R of the projection structure 50 is formed, in the process of forming the green color filter 22G, the green portion 50G of the projection structure 50 and the green portion 24G of the columnar spacer PSa are formed, and in the process of forming the blue color filter, the blue portion 50B of the projection structure 50 and the blue portion 24B of the columnar spacer PSa are formed. As described above, the columnar spacer PSa and the projection structure 50 are formed in the process of forming the color filter layer 22. As the material of the black matrix BM, a photosensitive resin material having a black color may be used, for example. As the material of each of the red color filter 22R, the green color filter 22G, and the blue color filter, for example, a colored photosensitive resin material (color resist) may be used. Thereafter, the second transparent conductive layer 28 is formed using a transparent conductive material on the color filter layer 22, the columnar spacer PSa, and the projection structure 50.

As illustrated in FIG. 1D, the counter substrate 20 may have a columnar spacer PSb disposed on the second transparent conductive layer 28. The columnar spacer PSb is formed of a photosensitive resin, for example. When the columnar spacer is formed on the second transparent conductive layer 28, the leakage with the active matrix substrate 10 may be suppressed as compared to the case where the columnar spacer is formed between the second substrate 21 and the second transparent conductive layer 28.

MODIFIED EXAMPLE

Figure 5:
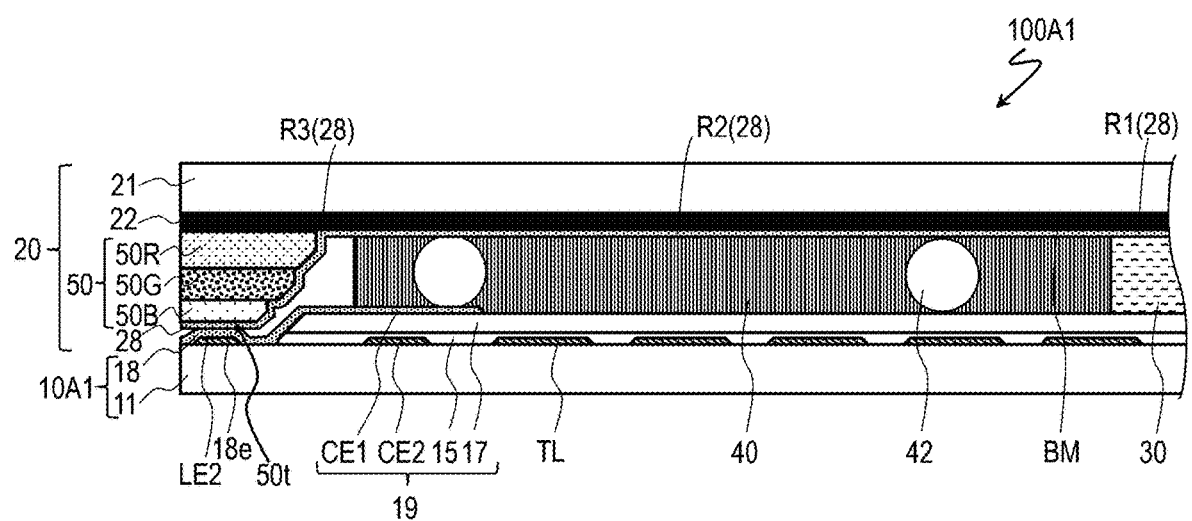
FIG. 5 is a schematic cross-sectional view of a liquid crystal display apparatus 100A1 according to a modified example of the first embodiment.
Figure 6:
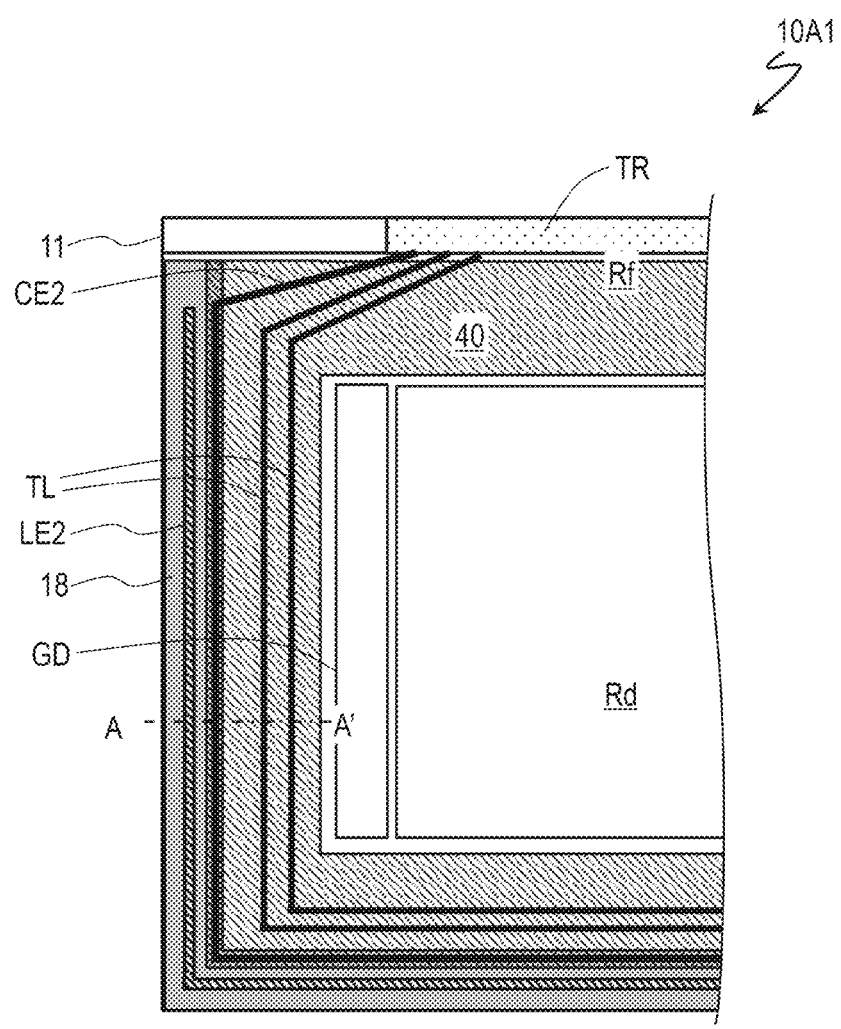
FIG. 6 is a schematic plan view of an active matrix substrate 10A1 included in the liquid crystal display apparatus 100A1.

A liquid crystal display apparatus 100A1 according to a modified example of the first embodiment will be described with reference to FIG. 5 and FIG. 6. FIG. 5 is a cross-sectional view schematically illustrating the liquid crystal display apparatus 100A1, and FIG. 6 is a plan view schematically illustrating an active matrix substrate 10A1 included in the liquid crystal display apparatus 100A1. FIG. 5 illustrates a cross section taken along a line A-A' in FIG. 6.

The liquid crystal display apparatus 100A1 is different from the liquid crystal display apparatus 100 including the active matrix substrate 10 in that the active matrix substrate 10A1 includes a conductive portion LE2. The conductive portion LE2 is provided between a first substrate 11 and a first transparent conductive layer 18. The conductive portion LE2 is provided in such a manner that the upper face thereof faces a top face 50t of a projection structure 50. A third section R3 of a second transparent conductive layer 28 is in contact with the first transparent conductive layer 18 (first extension portion 18e) on the top face 50t of the projection structure 50 and between the upper face of the conductive portion LE2 and the top face 50t of the projection structure 50. In this example, the conductive portion LE2 is included in the same layer (the gate metal layer in this example) as the layer of a second capacitance electrode CE2. In the illustrated example, when viewed from the normal direction of the first substrate 11, the conductive portion LE2 is formed extending along the sides (three sides excluding a side at which a terminal portion TR is provided (the side on the upper side)) of the first substrate 11. The conductive portion LE2 is formed as a single member in the illustrated example, but it may be constituted of two or more portions formed separately from each other. For example, the conductive portion LE2 may be constituted of a portion extending along the side on the left side of the first substrate 11, a portion extending along the side on the lower side of the first substrate 11, and a portion extending along the side on the right side of the first substrate 11, where these portions are formed separately from each other. For example, the conductive portion LE2 is allowed not to be electrically connected to the second capacitance electrode CE2. The conductive portion LE2 may be in a floating state. Alternatively, the conductive portion LE2 may be connected to the second capacitance electrode CE2 via a diode (diode-connection). When diode-connected, overcurrent to the conductive portion LE2 may be suppressed.

In the liquid crystal display apparatus 100A1 as well, similarly to the liquid crystal display apparatus 100, a display defect caused by ESD may be suppressed.

In the liquid crystal display apparatus 100A1, the adjustment may be made by a thickness of the conductive portion LE2 in addition to the thickness of the projection structure 50 in such a manner that the first extension portion 18e and the second transparent conductive layer 28 are in contact with each other on the top face 50t of the projection structure 50. The thickness of the conductive portion LE2 formed of a conductive material is about one fourth (for example, about 50 nm) the thickness of one color resist layer. Thus, the second transparent conductive layer 28 and the first transparent conductive layer 18 may be conductively connected to each other more reliably on the top face 50t of the projection structure 50. In the liquid crystal display apparatus 100A1, the occurrence of ESD in a display region Rd may be more effectively suppressed.

Instead of the conductive portion LE2 formed of a conductive material, a member having a structure similar to that of the conductive portion LE2 may be formed by using a semiconductor or an insulator. The thicknesses of members (films) formed of semiconductors or insulator materials vary depending on the materials, but may be set in a range of from about 400 nm to about 2 μm, for example. As a result, the degree of freedom in thickness of the projection structure 50 is increased, and the number of material options for forming the projection structure 50 may be increased.

Figure 7:
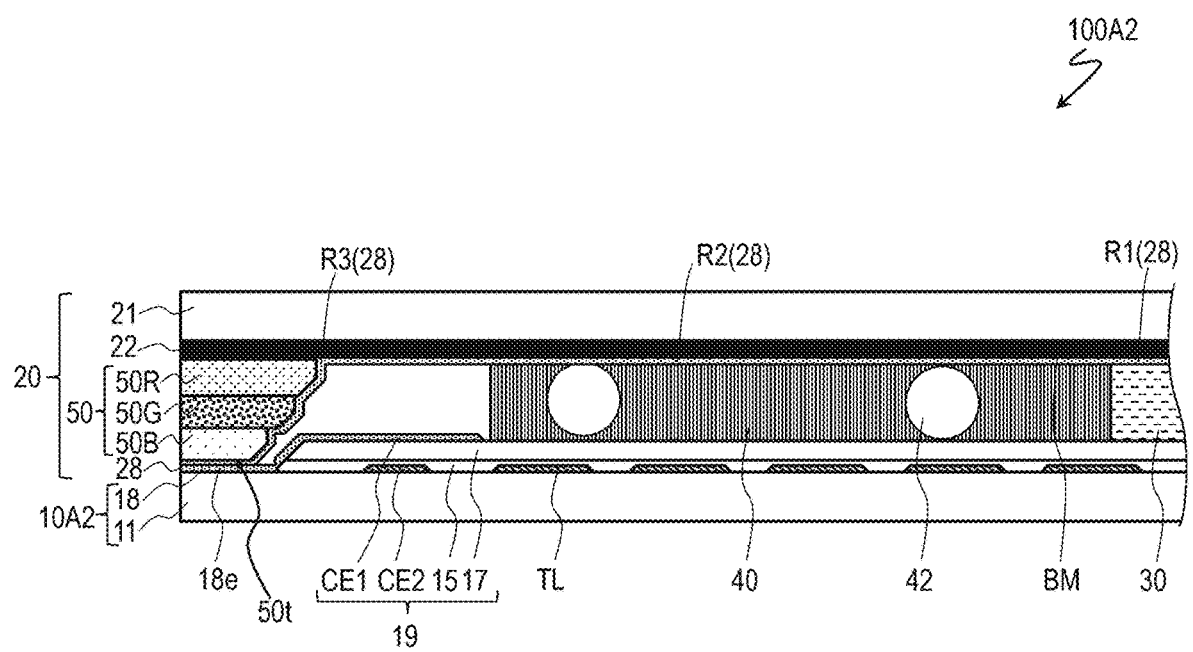
FIG. 7 is a schematic cross-sectional view of a liquid crystal display apparatus 100A2 according to another modified example of the first embodiment.
Figure 8:
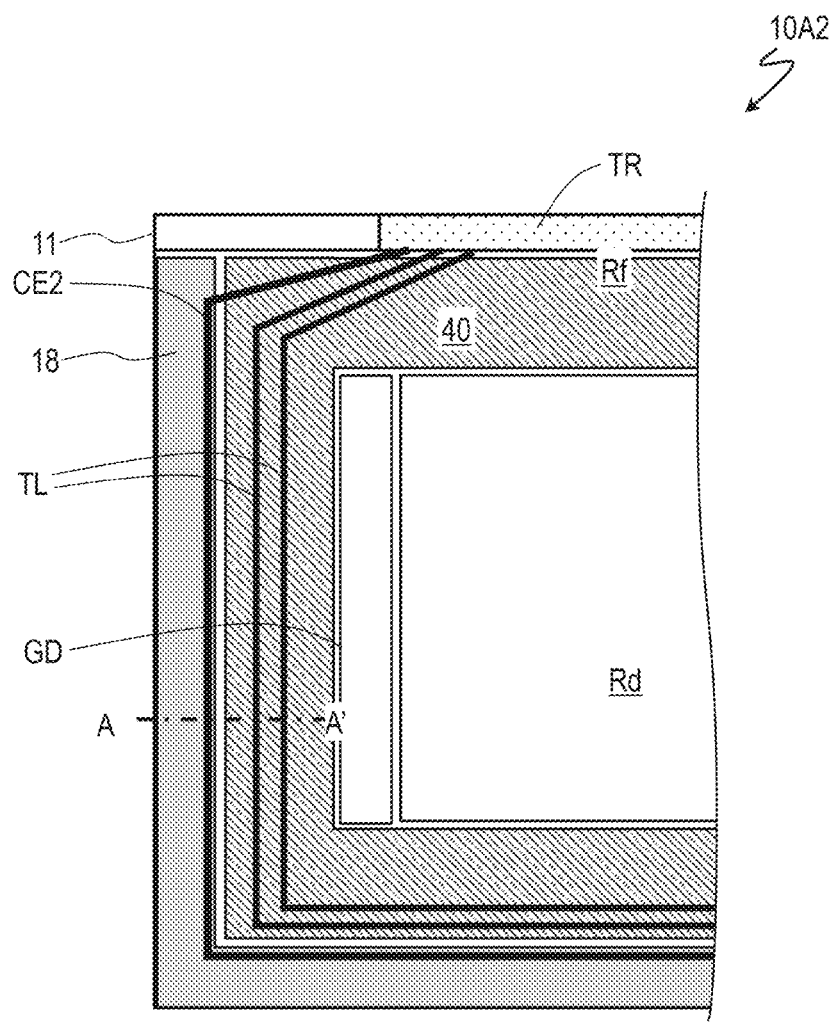
FIG. 8 is a schematic plan view of an active matrix substrate 10A2 included in the liquid crystal display apparatus 100A2.

A liquid crystal display apparatus 100A2 according to another modified example of the first embodiment will be described with reference to FIG. 7 and FIG. 8. FIG. 7 is a cross-sectional view schematically illustrating the liquid crystal display apparatus 100A2, and FIG. 8 is a plan view schematically illustrating an active matrix substrate 10A2 included in the liquid crystal display apparatus 100A2. FIG. 7 illustrates a cross section taken along a line A-A' in FIG. 8.

The liquid crystal display apparatus 100A2 is different from the liquid crystal display apparatus 100 in that a capacitance element 19 is disposed at an outer side of a sealing portion 40. That is, in the liquid crystal display apparatus 100A2, a first capacitance electrode CE1 does not overlap with the sealing portion 40 when viewed from the normal direction of a first substrate 11, and a second capacitance electrode CE2 does not overlap with the sealing portion 40 when viewed from the normal direction of the first substrate 11.

In the liquid crystal display apparatus 100A2 as well, similarly to the liquid crystal display apparatus 100, a display defect caused by ESD may be suppressed.

In the liquid crystal display apparatus 100A2 as well, similarly to the liquid crystal display apparatus 100A1, the active matrix substrate 10A2 may further include a conductive portion provided between the first substrate 11 and a first transparent conductive layer 18 and disposed such that an upper face thereof faces a top face 50t of a projection structure 50. When the conductive portion is further included, the same effect as that of the liquid crystal display apparatus 100A1 described above may be obtained.

Second Embodiment

Figure 9:
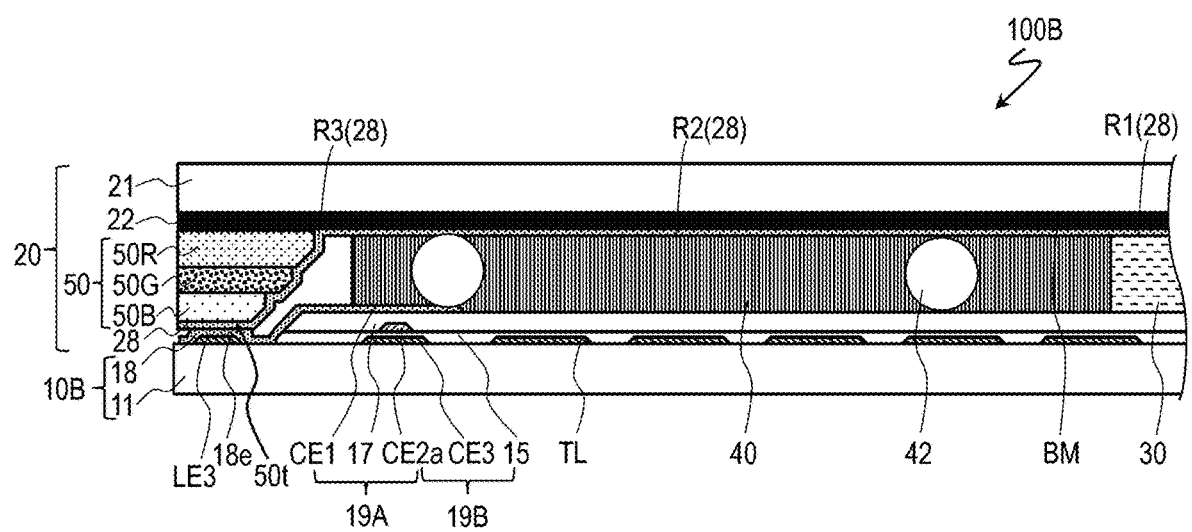
FIG. 9 is a schematic cross-sectional view of a liquid crystal display apparatus 100B according to a second embodiment of the disclosure.
Figure 10A:
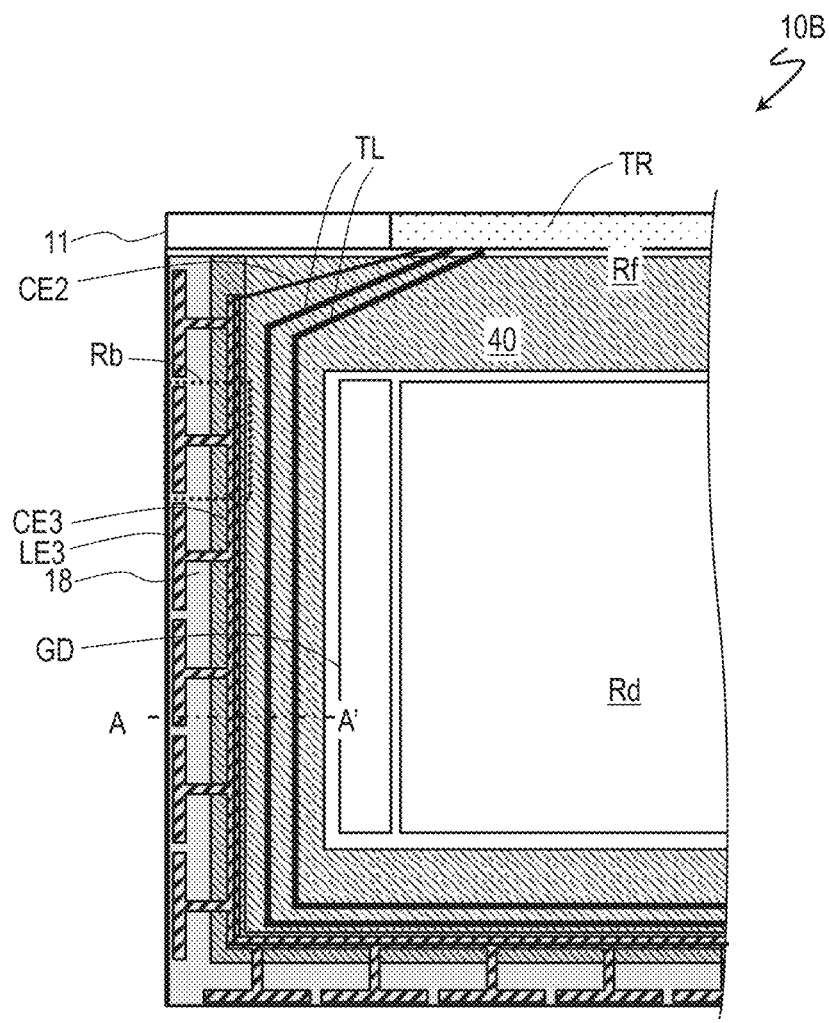
FIG. 10A is a schematic plan view of an active matrix substrate 10B included in the liquid crystal display apparatus 100B.
Figure 10B:
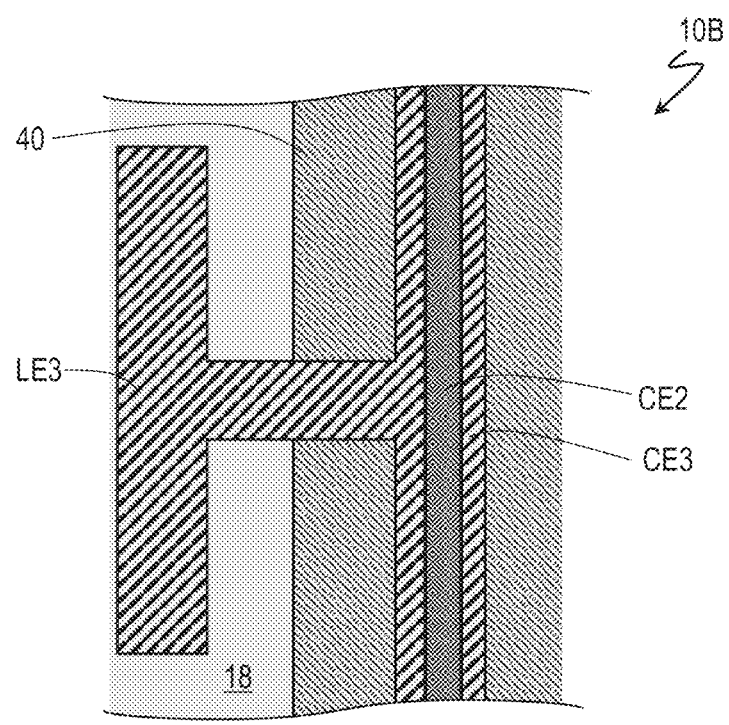
FIG. 10B is an enlarged view of a portion (a region Rb surrounded by a dotted line) in FIG. 10A.

A liquid crystal display apparatus 100B according to the present embodiment will be described with reference to FIG. 9, FIG. 10A, and FIG. 10B. FIG. 9 is a cross-sectional view schematically illustrating the liquid crystal display apparatus 100B, and FIG. 10A is a plan view schematically illustrating an active matrix substrate 10B included in the liquid crystal display apparatus 100B. FIG. 9 illustrates a cross section taken along a line A-A' in FIG. 10A. FIG. 10B is an enlarged view of a portion (a region Rb surrounded by a dotted line) in FIG. 10A. The following description will primarily focus on differences between the liquid crystal display apparatus 100B of the present embodiment and the liquid crystal display apparatus 100 of the first embodiment.

The liquid crystal display apparatus 100B is different from the liquid crystal display apparatus 100 including the active matrix substrate 10 including the capacitance element 19 in that the liquid crystal display apparatus 100B includes the active matrix substrate 10B including a capacitance element 19A (referred to as a "first capacitance element 19A" in some cases) and an additional capacitance element 19B (referred to as a "second capacitance element 19B" in some cases).

The first capacitance element 19A includes a first capacitance electrode CE1, a second capacitance electrode CE2a disposed opposing the first capacitance electrode CE1 between the first capacitance electrode CE1 and a first substrate 11, and a dielectric layer 17 located between the first capacitance electrode CE1 and the second capacitance electrode CE2a. The second capacitance element 19B includes the second capacitance electrode CE2a, a third capacitance electrode CE3 disposed opposing the second capacitance electrode CE2a between the second capacitance electrode CE2a and the first substrate 11, and a dielectric layer 15 located between the second capacitance electrode CE2a and the third capacitance electrode CE3. In this case, the second capacitance electrode CE2a is included, for example, in a conductive layer (source metal layer) including the source electrode 4 of the TFT 1 having a bottom gate structure. That is, for example, by patterning a conductive film (source metal film) to form the source electrode 4, the second capacitance electrode CE2a and the source electrode 4 are formed in the same process.

In this case, the first capacitance element 19A and the second capacitance element 19B are disposed at least partially overlapping with (in the example illustrated in the drawing, disposed entirely overlapping with) a sealing portion 40 when viewed from the normal direction of the first substrate 11. That is, the first capacitance electrode CE1 at least partially overlaps with (entirely overlaps with in the illustrated example) the sealing portion 40 when viewed from the normal direction of the first substrate 11, the second capacitance electrode CE2a at least partially overlaps with (entirely overlaps with in the illustrated example) the sealing portion 40 when viewed from the normal direction of the first substrate 11, and the third capacitance electrode CE3 at least partially overlaps with (entirely overlaps with in the illustrated example) the sealing portion 40 when viewed from the normal direction of the first substrate 11.

In the liquid crystal display apparatus 100B as well, since a second transparent conductive layer 28 is conductively connected to a first transparent conductive layer 18 on a top face 50t of a projection structure 50 in a peripheral region Rf, an electric charge accumulated in the second transparent conductive layer 28 is charged in the first capacitance element 19A via the first capacitance electrode CE1 included in the first transparent conductive layer 18. As a result, the movement of the electric charge accumulated in the second transparent conductive layer 28 to a display region Rd through the second transparent conductive layer 28 is suppressed, and thus the occurrence of ESD in the display region Rd is suppressed. Thus, the liquid crystal display apparatus 100B may suppress a display defect caused by ESD.

The active matrix substrate 10B included in the liquid crystal display apparatus 100B further includes a conductive portion LE3 provided such that an upper face thereof faces the top face 50t of the projection structure 50. A third section R3 of the second transparent conductive layer 28 is in contact with a first extension portion 18e between an upper face of the conductive portion LE3 and the top face 50t of the projection structure 50. The first extension portion 18e is in contact with the upper face of the conductive portion LE3.

In the liquid crystal display apparatus 100B, the third capacitance electrode CE3 is electrically connected to the first extension portion 18e via the conductive portion LE3. In this example, the conductive portion LE3 is included in the same layer as the third capacitance electrode CE3 and extends from the third capacitance electrode CE3.

In the liquid crystal display apparatus 100B, since the second transparent conductive layer 28 is conductively connected to the first transparent conductive layer 18 on the top face 50t of the projection structure 50 in the peripheral region Rf, and the first transparent conductive layer 18 and the third capacitance electrode CE3 are electrically connected to each other, an electric charge accumulated in the second transparent conductive layer 28 is charged also in the second capacitance element 19B via the third capacitance electrode CE3. As a result, the movement of the electric charge accumulated in the second transparent conductive layer 28 to the display region Rd through the second transparent conductive layer 28 may be more effectively suppressed. Thus, the liquid crystal display apparatus 100B may more effectively suppress a display defect caused by ESD.

In the example illustrated in FIG. 10A and FIG. 10B, a plurality of the conductive portions LE3 extending from the third capacitance electrode CE3 are provided, and each of the plurality of conductive portions LE3 is substantially T-shaped when viewed from the normal direction of the first substrate 11. In the illustrated example, when viewed from the normal direction of the first substrate 11, the third capacitance electrode CE3 is formed extending along a side of the first substrate 11. Each of the plurality of conductive portions LE3 extends from the third capacitance electrode CE3 to an outer side of the third capacitance electrode CE3 (farther from the display region Rd than the third capacitance electrode CE3). By providing the plurality of substantially T-shaped conductive portions LE3, it is possible to increase an area where the plurality of conductive portions LE3 and the first extension portion 18e are in contact with each other. As the area where the plurality of conductive portions LE3 and the first extension portion 18e are in contact with each other becomes larger, contact resistance between them becomes smaller, and as a result, it becomes easier for an electric charge accumulated in the second transparent conductive layer 28 to move to the conductive portion LE3 and the third capacitance electrode CE3 connected to the conductive portion LE3 via the first extension portion 18e. The electric charge having moved to the third capacitance electrode CE3 may be charged in the second capacitance element 19B. The electric charge accumulated in the second transparent conductive layer 28 may move to the first capacitance electrode CE1 via the first extension portion 18e and may be charged also in the first capacitance element 19A. However, for example, when the electrostatic capacitance value of the second capacitance element 19B is larger than that of the first capacitance element 19A, it is preferable to cause the second capacitance element 19B to absorb more electric charges. For example, as described above, by decreasing the contact resistance between the plurality of conductive portions LE3 and the first extension portion 18e, it is possible to cause the second capacitance element 19B to absorb more electric charges. For example, the electrostatic capacitance value of the second capacitance element 19B may be larger than that of the first capacitance element 19A because the dielectric layer 15 (the same layer as the gate insulating layer) included in the second capacitance element 19B is thinner than the dielectric layer 17 (the same layer as the interlayer inorganic insulating layer) included in the first capacitance element 19A.

As illustrated in FIG. 10A and FIG. 10B, the plurality of conductive portions LE3 have portions extending parallel to the sides of the first substrate 11 when viewed from the normal direction of the first substrate 11. In the peripheral region Rf, since the conductive portions LE3 are disposed along the sides of the first substrate 11 so as to extend parallel to the sides of the first substrate 11, the conductive portions LE3 are expected to receive static electricity entering from the outside. Further, by disposing adjacent conductive portions LE3 of the plurality of substantially T-shaped conductive portions LE3 with a space interposed therebetween, the area of the plurality of conductive portions LE3 is suppressed from becoming excessively large. When the area of the plurality of conductive portions LE3 is excessively large, static electricity entering from the outside may be excessively accumulated or static electricity may be easily produced inside the liquid crystal display apparatus 100B. The occurrence of these problems may be suppressed by disposing the plurality of substantially T-shaped conductive portions LE3 with a space interposed therebetween.

The planar shape (shape when viewed from the normal direction of the first substrate 11) of the third capacitance electrode CE3 and the conductive portion LE3 is not limited to the illustrated example. For example, a ladder shape may be formed as in the example illustrated in FIG. 15A and FIG. 15B. However, in the case of the ladder-like planar shape, there is a case where static electricity entering from the outside may be excessively accumulated or static electricity may be easily produced on the inside as discussed above. From the viewpoint of suppressing these problems, it is preferable that the third capacitance electrode CE3 and the conductive portion LE3 be formed not entirely of the same conductive layer, and that the third capacitance electrode CE3 and the conductive portion LE3 be formed of two or more different conductive layers. For example, it is preferable that the third capacitance electrode CE3 and the conductive portion LE3 be formed including a portion included in the gate metal layer, a portion included in the source metal layer, and a contact hole formed in the dielectric layer 15 for connecting these portions.

In the illustrated example, when viewed from the normal direction of the first substrate 11, a second capacitance electrode CE2 is also formed extending along a side of the first substrate 11. As illustrated in FIG. 10A and FIG. 10B, the width of the third capacitance electrode CE3 may be wider than the width of the second capacitance electrode CE2. Alternatively, the width of the third capacitance electrode CE3 and the width of the second capacitance electrode CE2 are not limited thereto, and may be substantially the same.

Third Embodiment

Figure 11:
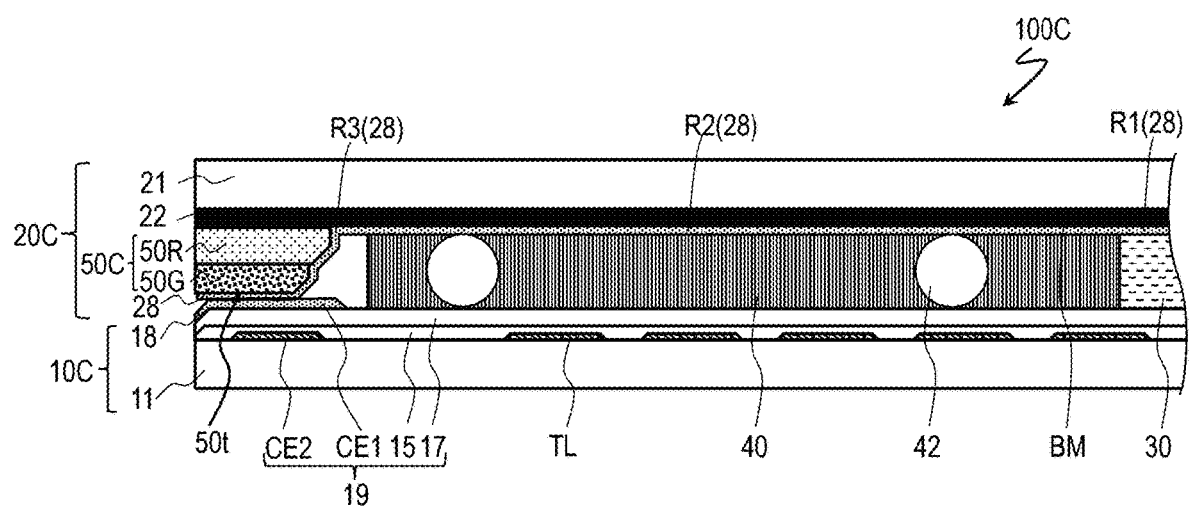
FIG. 11 is a schematic cross-sectional view of a liquid crystal display apparatus 100C according to a third embodiment of the disclosure.
Figure 12:
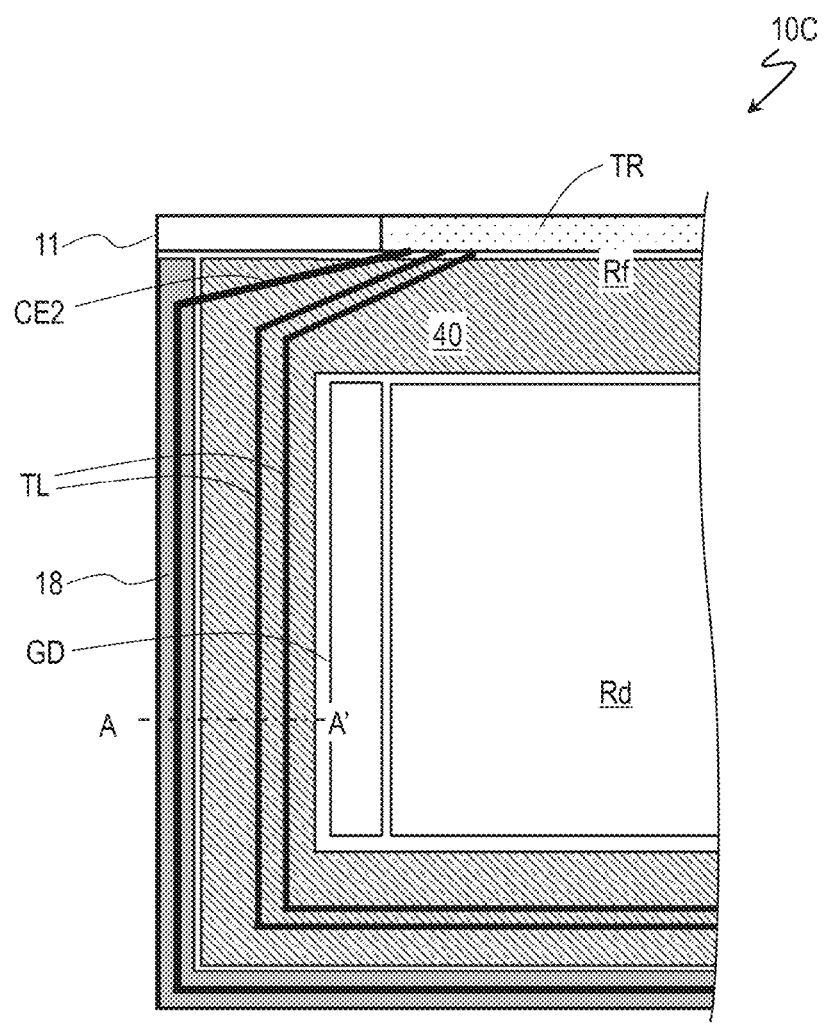
FIG. 12 is a schematic plan view of an active matrix substrate 10C included in the liquid crystal display apparatus 100C.
Figure 13:
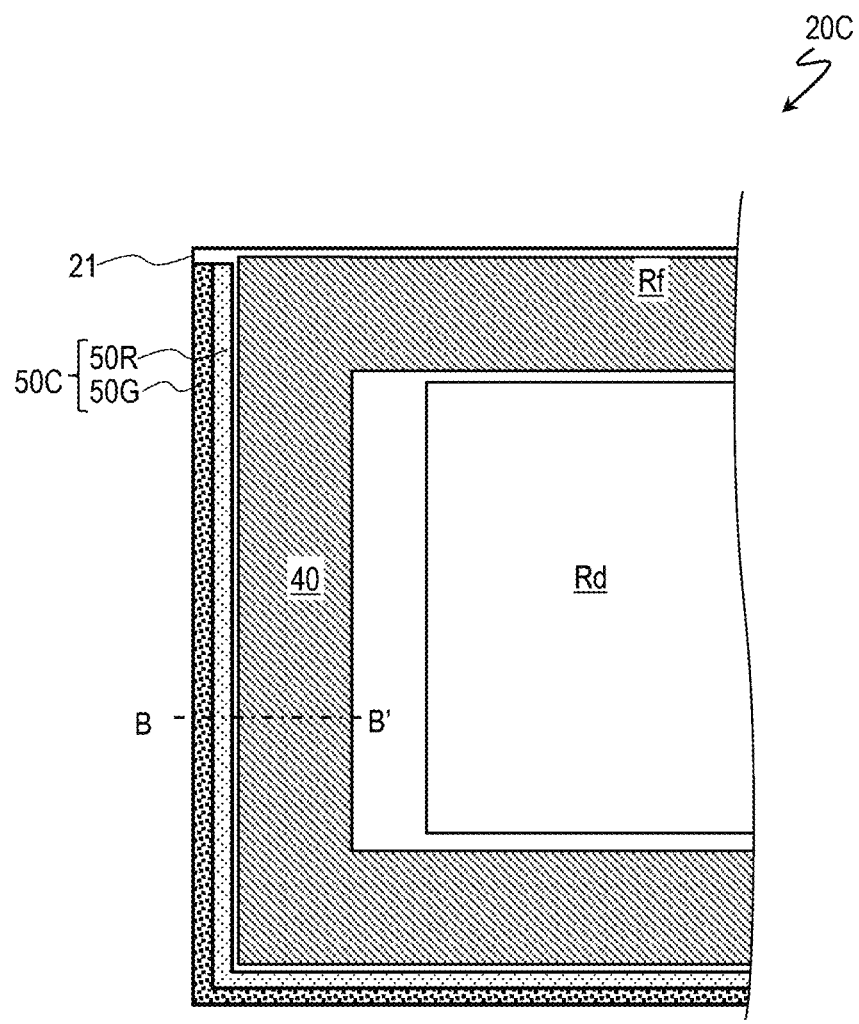
FIG. 13 is a schematic plan view of a counter substrate 20C included in the liquid crystal display apparatus 100C.

A liquid crystal display apparatus 100C according to the present embodiment will be described with reference to FIG. 11, FIG. 12, and FIG. 13. FIG. 11 is a cross-sectional view schematically illustrating the liquid crystal display apparatus 100C, FIG. 12 is a plan view schematically illustrating an active matrix substrate 10C included in the liquid crystal display apparatus 100C, and FIG. 13 is a plan view schematically illustrating a counter substrate 20C included in the liquid crystal display apparatus 100C. FIG. 11 illustrates a cross section taken along a line A-A' in FIG. 12 and a line B-B' in FIG. 13. The following description will primarily focus on differences between the liquid crystal display apparatus 100C of the present embodiment and the liquid crystal display apparatus 100 of the first embodiment.

The liquid crystal display apparatus 100C differs from the liquid crystal display apparatus 100 of the first embodiment in that a third section R3 of a second transparent conductive layer 28 is in contact with a first capacitance electrode CE1 on a top face 50t of a projection structure 50C. As described earlier, in the liquid crystal display apparatus 100 of the first embodiment, the third section R3 of the second transparent conductive layer 28 is in contact with the first extension portion 18e extending from the first capacitance electrode CE1 and disposed farther from the sealing portion 40 than the first capacitance electrode CE1 on the top face 50t of the projection structure 50.

In the liquid crystal display apparatus 100C, since the second transparent conductive layer 28 is conductively connected to a first transparent conductive layer 18 on the top face 50t of the projection structure 50C in a peripheral region Rf, an electric charge accumulated in the second transparent conductive layer 28 is charged in a capacitance element 19 via the first capacitance electrode CE1 included in the first transparent conductive layer 18. As a result, the movement of the electric charge accumulated in the second transparent conductive layer 28 to a display region Rd through the second transparent conductive layer 28 is suppressed, and thus the occurrence of ESD in the display region Rd is suppressed. Thus, the liquid crystal display apparatus 100C may suppress a display defect caused by ESD.

The capacitance element 19 of the liquid crystal display apparatus 100C is provided at an outer side of a sealing portion 40. That is, the first capacitance electrode CE1 does not overlap with the sealing portion 40 when viewed from the normal direction of a first substrate 11, and a second capacitance electrode CE2 does not overlap with the sealing portion 40 when viewed from the normal direction of the first substrate 11.

In this example, the projection structure 50C includes a red portion 50R formed of the same material as a red color filter, a portion 50G formed on the red portion 50R and formed of the same material as a green color filter. The structure, the material, and the like of the projection structure 50C are not limited to the illustrated example, and it is sufficient that the height of the top face 50t of the projection structure 50C is adjusted by adjusting the thickness of the projection structure 50C (the thickness of the projection structure 50C in the normal direction of a second substrate 21) such that the first capacitance electrode CE1 and the second transparent conductive layer 28 are in contact with each other on the top face 50t of the projection structure 50C.

In the liquid crystal display apparatus 100C as well, similarly to the liquid crystal display apparatus 100A1, the active matrix substrate 10C may further include a conductive portion provided between the first substrate 11 and the first transparent conductive layer 18 and disposed such that an upper face thereof faces the top face 50t of the projection structure 50C. The conductive portion may be provided, for example, between a dielectric layer 17 and the first transparent conductive layer 18 in the liquid crystal display apparatus 100C. When the conductive portion is further included, the same effect as that of the liquid crystal display apparatus 100A1 described above may be obtained.

Fourth Embodiment

Figure 14:
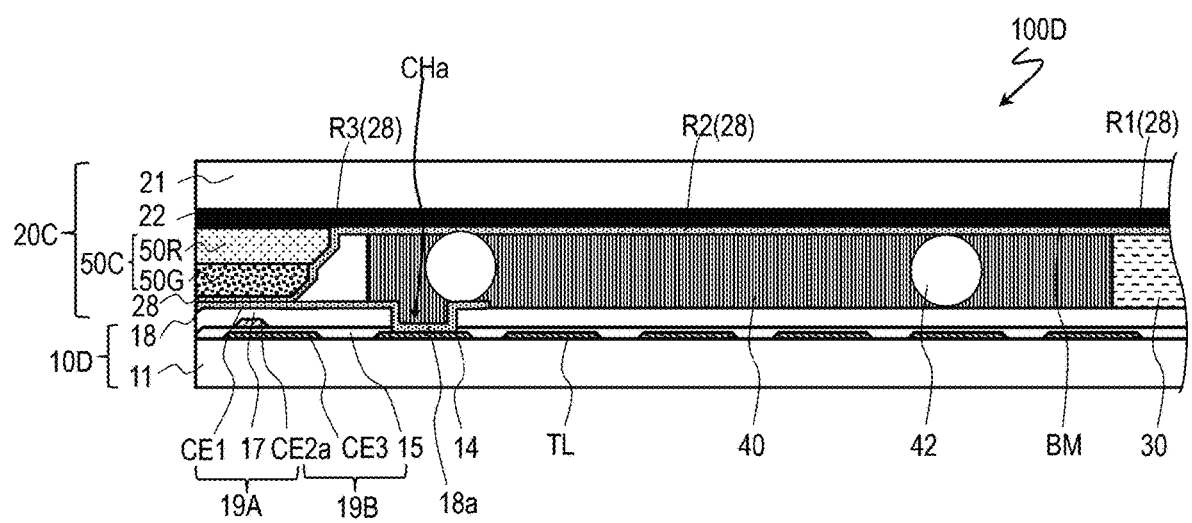
FIG. 14 is a schematic cross-sectional view of a liquid crystal display apparatus 100D according to a fourth embodiment of the disclosure.
Figure 15A:
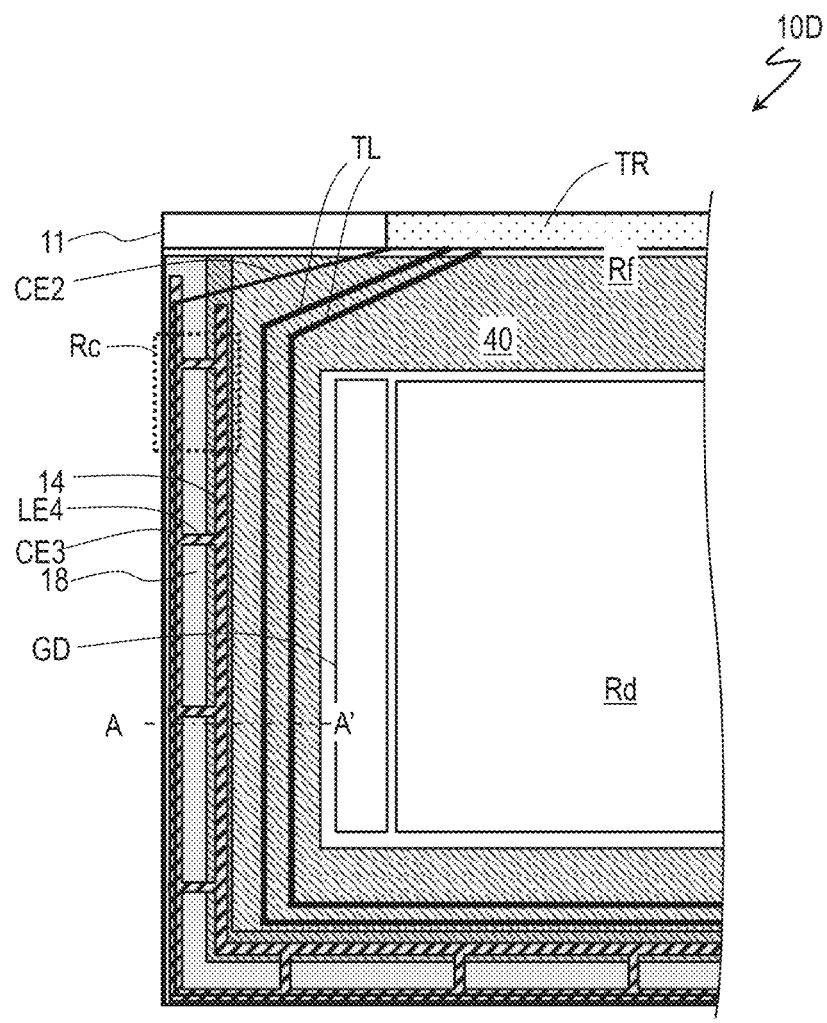
FIG. 15A is a schematic plan view of an active matrix substrate 10D included in the liquid crystal display apparatus 100D.
Figure 15B:
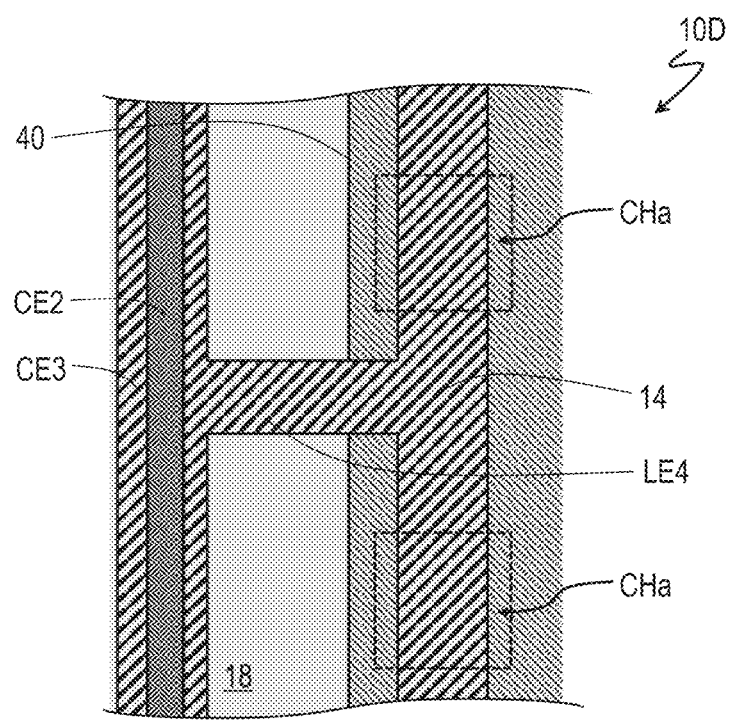
FIG. 15B is an enlarged view of a portion (a region Rc surrounded by a dotted line) in FIG. 15A.

A liquid crystal display apparatus 100D of the present embodiment will be described with reference to FIG. 14, FIG. 15A, and FIG. 15B. FIG. 14 is a cross-sectional view schematically illustrating the liquid crystal display apparatus 100D, FIG. 15A is a plan view schematically illustrating an active matrix substrate 10D included in the liquid crystal display apparatus 100D, and FIG. 15B is an enlarged view of a portion (a region Rc surrounded by a dotted line) in FIG. 15A. FIG. 14 illustrates a cross section taken along a line A-A' in FIG. 15A. The following description will primarily focus on differences between the liquid crystal display apparatus 100D of the present embodiment and the liquid crystal display apparatus 100C of the third embodiment.

The liquid crystal display apparatus 100D is different from the liquid crystal display apparatus 100C including the active matrix substrate 10C including the capacitance element 19 in that the liquid crystal display apparatus 100D includes an active matrix substrate 10D including a capacitance element 19A (referred to as a "first capacitance element 19A" in some cases) and an additional capacitance element 19B (referred to as a "second capacitance element 19B" in some cases).

The first capacitance element 19A includes a first capacitance electrode CE1, a second capacitance electrode CE2a disposed opposing the first capacitance electrode CE1 between the first capacitance electrode CE1 and a first substrate 11, and a dielectric layer 17 located between the first capacitance electrode CE1 and the second capacitance electrode CE2a. The second capacitance element 19B includes the second capacitance electrode CE2a, a third capacitance electrode CE3 disposed opposing the second capacitance electrode CE2a between the second capacitance electrode CE2a and the first substrate 11, and a dielectric layer 15 located between the second capacitance electrode CE2a and the third capacitance electrode CE3. In this case, the second capacitance electrode CE2a is included, for example, in a conductive layer (source metal layer) including the source electrode 4 of the TFT 1 having a bottom gate structure.

In the liquid crystal display apparatus 100D as well, since a second transparent conductive layer 28 is conductively connected to a first transparent conductive layer 18 on a top face 50t of a projection structure 50C in a peripheral region Rf, an electric charge accumulated in the second transparent conductive layer 28 is charged in the first capacitance element 19A via the first capacitance electrode CE1 included in the first transparent conductive layer 18. As a result, the movement of the electric charge accumulated in the second transparent conductive layer 28 to a display region Rd through the second transparent conductive layer 28 is suppressed, and thus the occurrence of ESD in the display region Rd is suppressed. Thus, the liquid crystal display apparatus 100D may suppress a display defect caused by ESD.

In this case, the first capacitance element 19A and the second capacitance element 19B are disposed at an outer side of a sealing portion 40 when viewed from the normal direction of the first substrate 11. That is, the first capacitance electrode CE1 does not overlap with the sealing portion 40 when viewed from the normal direction of the first substrate 11, the second capacitance electrode CE2a does not overlap with the sealing portion 40 when viewed from the normal direction of the first substrate 11, and the third capacitance electrode CE3 does not overlap with the sealing portion 40 when viewed from the normal direction of the first substrate 11.

In the liquid crystal display apparatus 100D, the third capacitance electrode CE3 is electrically connected to the first capacitance electrode CE1. The active matrix substrate 10D further includes a contact portion 14 included in the same conductive layer (in this case, the gate metal layer) as the third capacitance electrode CE3 and electrically connected to the third capacitance electrode CE3. The dielectric layer 17 included in the first capacitance element 19A and the dielectric layer 15 included in the second capacitance element 19B have a contact hole CHa (not illustrated in FIG. 15A) reaching the contact portion 14. The first transparent conductive layer 18 further includes a second extension portion 18a extending from the first capacitance electrode CE1 and disposed closer to the sealing portion 40 than the first capacitance electrode CE1, and the second extension portion 18a is connected to the contact portion 14 inside the contact hole CHa. The first capacitance electrode CE1 and the second extension portion 18a are continuously (integrally) formed.

In the liquid crystal display apparatus 100D, since the second transparent conductive layer 28 is conductively connected to the first transparent conductive layer 18 on the top face 50t of the projection structure 50C in the peripheral region Rf, and the first transparent conductive layer 18 and the third capacitance electrode CE3 are electrically connected to each other, an electric charge accumulated in the second transparent conductive layer 28 is charged also in the second capacitance element 19B via the third capacitance electrode CE3. As a result, the movement of the electric charge accumulated in the second transparent conductive layer 28 to the display region Rd through the second transparent conductive layer 28 may be more effectively suppressed. Thus, the liquid crystal display apparatus 100D may more effectively suppress a display defect caused by ESD.

The contact hole CHa is covered with the sealing portion 40 when viewed from the normal direction of the first substrate 11. That is, when viewed from the normal direction of the first substrate 11, the entire contact hole CHa overlaps with the sealing portion 40. The number of contact holes CHa and the planar shape of the contact hole CHa (the shape when viewed from the normal direction of the first substrate 11) are not limited to the illustrated example, and may be modified as appropriate.

As illustrated in FIG. 15A and FIG. 15B, in the illustrated example, when viewed from the normal direction of the first substrate 11, the third capacitance electrode CE3 is formed extending along a side of the first substrate 11. The contact portion 14 extends substantially parallel to the third capacitance electrode CE3 when viewed from the normal direction of the first substrate 11. The layer including the third capacitance electrode CE3 (in this case, the gate metal layer) further includes a plurality of connection portions LE4 each configured to connect the contact portion 14 and the third capacitance electrode CE3. In this example, the third capacitance electrode CE3 and the contact portions 14, and the plurality of connection portions LE4 each connecting the third capacitance electrode CE3 and the contact portion 14, are formed in a ladder shape. The planar shapes of the third capacitance electrode CE3 and the contact portion 14 are not limited to the illustrated example. For example, the contact portion 14 may extend from the third capacitance electrode CE3 and be substantially T-shaped when viewed from the normal direction of the first substrate 11.

As illustrated in FIG. 15A and FIG. 15B, the width of the third capacitance electrode CE3 may be wider than the width of the second capacitance electrode CE2, but the widths thereof are not limited thereto, and the width of the third capacitance electrode CE3 may be substantially equal to the width of the second capacitance electrode CE2.

Fifth Embodiment

Figure 16:
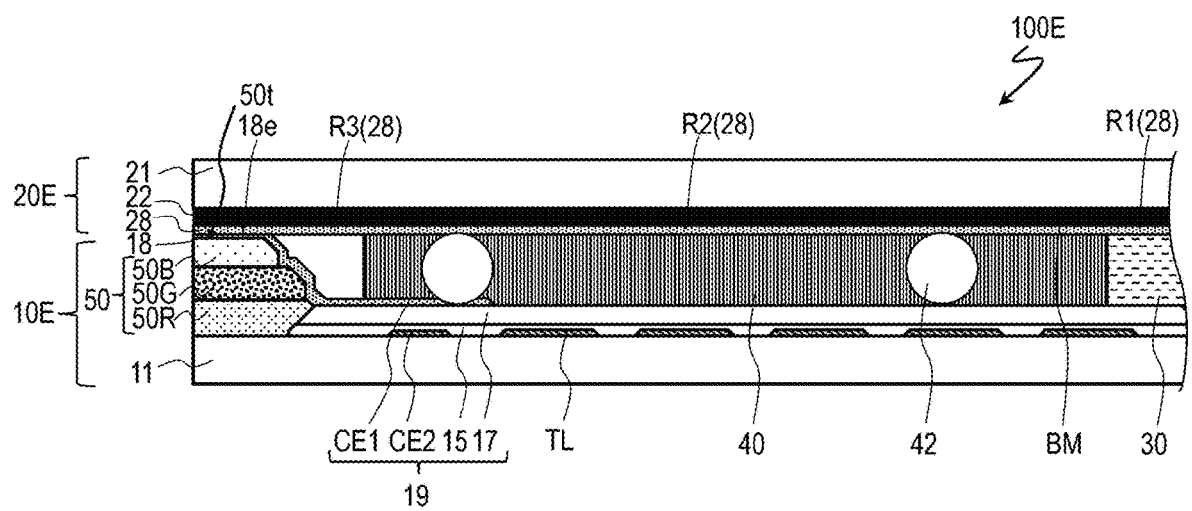
FIG. 16 is a schematic cross-sectional view of a liquid crystal display apparatus 100E according to a fifth embodiment of the disclosure.

A liquid crystal display apparatus 100E of the present embodiment will be described with reference to FIG. 16. FIG. 16 is a cross-sectional view schematically illustrating the liquid crystal display apparatus 100E. The following description will primarily focus on differences between the liquid crystal display apparatus 100E of the present embodiment and the liquid crystal display apparatus 100 of the first embodiment.

The liquid crystal display apparatus 100E is different from the liquid crystal display apparatus 100 with the counter substrate 20 including the projection structure 50 in that an active matrix substrate 10E includes a projection structure 50 projecting toward the side of a counter substrate 20E.

The liquid crystal display apparatus 100E has a color filter on array structure. That is, although not illustrated here, the active matrix substrate 10E includes a color filter layer having a plurality of color filters in a display region Rd.

The projection structure 50 is formed of the same materials (color resists) as those of the plurality of color filters included in the active matrix substrate 10E. A color filter layer 22 of the counter substrate 20E includes a black matrix (light blocking layer) BM in a peripheral region Rf.

In the liquid crystal display apparatus 100E as well, since a second transparent conductive layer 28 is conductively connected to a first transparent conductive layer 18 on a top face 50t of the projection structure 50 in the peripheral region Rf, an electric charge accumulated in the second transparent conductive layer 28 is charged in a capacitance element 19 via a first capacitance electrode CE1 included in the first transparent conductive layer 18. As a result, the movement of the electric charge accumulated in the second transparent conductive layer 28 to the display region Rd through the second transparent conductive layer 28 is suppressed, and thus the occurrence of ESD in the display region Rd is suppressed. Thus, the liquid crystal display apparatus 100E may suppress a display defect caused by ESD.

The liquid crystal display apparatus of the embodiments of the disclosure may suppress display defects caused by ESD.

What is claimed is:

1. A liquid crystal display apparatus, comprising:
   an active matrix substrate;
   a counter substrate opposing the active matrix substrate;
   a liquid crystal layer provided between the active matrix substrate and the counter substrate; and
   a sealing portion provided between the active matrix substrate and the counter substrate and surrounding the liquid crystal layer,
   wherein the active matrix substrate includes a first substrate and a first transparent conductive layer supported by the first substrate,
   the counter substrate includes a second substrate and a second transparent conductive layer supported by the second substrate,
   the active matrix substrate further includes a capacitance element disposed at an outer side of the sealing portion or disposed at least partially overlapping with the sealing portion in a view from a normal direction of the first substrate, the capacitance element including a first capacitance electrode included in the first transparent conductive layer, a second capacitance electrode disposed opposing the first capacitance electrode between the first capacitance electrode and the first substrate, and a dielectric layer located between the first capacitance electrode and the second capacitance electrode,
   one of the active matrix substrate and the counter substrate further includes a projection structure disposed at an outer side of the sealing portion, provided between the first substrate and the first transparent conductive layer or between the second substrate and the second transparent conductive layer, and projecting toward a side of the other one of the active matrix substrate and the counter substrate,
   the second transparent conductive layer includes a first section present in a region surrounded by the sealing portion, a second section overlapping with the sealing portion in a view from a normal direction of the second substrate, and a third section present at an outer side of the sealing portion, and
   the third section of the second transparent conductive layer is in contact with the first transparent conductive layer on a top face of the projection structure.

2. The liquid crystal display apparatus according to claim 1,
   wherein the capacitance element is disposed at least partially overlapping with the sealing portion in a view from the normal direction of the first substrate.

3. The liquid crystal display apparatus according to claim 1,
   wherein the capacitance element is disposed at an outer side of the sealing portion.

4. The liquid crystal display apparatus according to claim 1,
   wherein the first transparent conductive layer further includes a first extension portion extending from the first capacitance electrode and disposed farther from the sealing portion than the first capacitance electrode, and
   the third section of the second transparent conductive layer is in contact with the first extension portion on the top face of the projection structure.

5. The liquid crystal display apparatus according to claim 1,
   wherein the other one of the active matrix substrate and the counter substrate further includes a conductive portion provided between the first substrate and the first transparent conductive layer or between the second substrate and the second transparent conductive layer in such a manner that an upper face of the conductive portion opposes the top face of the projection structure, and
   the third section of the second transparent conductive layer is in contact with the first transparent conductive layer between the upper face of the conductive portion and the top face of the projection structure.

6. The liquid crystal display apparatus according to claim 5,
   wherein the active matrix substrate further includes an additional capacitance element including the second capacitance electrode, a third capacitance electrode disposed opposing the second capacitance electrode between the second capacitance electrode and the first substrate, and an additional dielectric layer located between the second capacitance electrode and the third capacitance electrode.

7. The liquid crystal display apparatus according to claim 6,
   wherein the third capacitance electrode is electrically connected to the first transparent conductive layer.

8. The liquid crystal display apparatus according to claim 6,
   wherein the conductive portion and the third capacitance electrode are included in an identical layer.

9. The liquid crystal display apparatus according to claim 8,
   wherein the conductive portion extends from the third capacitance electrode and is substantially T-shaped in a view from the normal direction of the first substrate.

10. The liquid crystal display apparatus according to claim 3,
    wherein the third section of the second transparent conductive layer is in contact with the first capacitance electrode on the top face of the projection structure.

11. The liquid crystal display apparatus according to claim 10,
    wherein the active matrix substrate further includes an additional capacitance element including the second capacitance electrode, a third capacitance electrode disposed opposing the second capacitance electrode between the second capacitance electrode and the first substrate, and an additional dielectric layer located between the second capacitance electrode and the third capacitance electrode.

12. The liquid crystal display apparatus according to claim 11,
wherein the third capacitance electrode is electrically connected to the first capacitance electrode.

13. The liquid crystal display apparatus according to claim 12,
wherein the active matrix substrate further includes a contact portion included in a conductive layer identical to the conductive layer of the third capacitance electrode and electrically connected to the third capacitance electrode,
the dielectric layer and the additional dielectric layer include a contact hole reaching the contact portion,
the first transparent conductive layer further includes a second extension portion extending from the first capacitance electrode and disposed closer to the sealing portion than the first capacitance electrode, and
the second extension portion is connected to the contact portion inside the contact hole.

14. The liquid crystal display apparatus according to claim 13,
wherein the contact hole is covered with the sealing portion in a view from the normal direction of the first substrate.

15. The liquid crystal display apparatus according to claim 13,
wherein the contact portion extends substantially parallel to the third capacitance electrode in a view from the normal direction of the first substrate, and
the layer including the third capacitance electrode further includes a connection portion configured to connect the contact portion and the third capacitance electrode.

16. The liquid crystal display apparatus according to claim 1,
wherein the counter substrate includes the projection structure,
the counter substrate includes a color filter layer including a color filter, and
the projection structure is formed of a material identical to a material of the color filter.

17. The liquid crystal display apparatus according to claim 16,
wherein the counter substrate further includes a spacer provided in a region surrounded by the sealing portion and configured to define a distance between the active matrix substrate and the counter substrate, and
the spacer is formed of a material identical to the material of the color filter and is provided between the second substrate and the second transparent conductive layer.

18. The liquid crystal display apparatus according to claim 1,
wherein the active matrix substrate includes the projection structure,
the active matrix substrate includes a color filter layer including a color filter, and
the projection structure is formed of a material identical to a material of the color filter.

19. The liquid crystal display apparatus according to claim 16,
wherein the color filter layer includes a plurality of the color filters, and
the projection structure includes a plurality of portions each formed of a material identical to a material of a corresponding color filter of the plurality of color filters having mutually different colors among the plurality of color filters.

20. The liquid crystal display apparatus according to claim 1,
wherein the sealing portion includes conductive particles.

* * * * *